United States Patent
Barth

(10) Patent No.: US 7,563,486 B2
(45) Date of Patent: Jul. 21, 2009

(54) SYSTEMS AND METHODS FOR DESIGNING AND FABRICATING MULTI-LAYER STRUCTURES HAVING THERMAL EXPANSION PROPERTIES

(75) Inventor: Phillip W. Barth, Portola Valley, CA (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 425 days.

(21) Appl. No.: 11/441,599

(22) Filed: Jul. 11, 2006

(65) Prior Publication Data

US 2006/0254696 A1 Nov. 16, 2006

Related U.S. Application Data

(62) Division of application No. 10/118,806, filed on Apr. 9, 2002, now Pat. No. 7,095,933.

(51) Int. Cl.
*B05D 3/00* (2006.01)

(52) U.S. Cl. .................. 427/402; 427/372.2; 427/374.1; 427/398.1

(58) Field of Classification Search ........................ None
See application file for complete search history.

(56) References Cited

U.S. PATENT DOCUMENTS

| | | | |
|---|---|---|---|
| 4,904,037 A | | 2/1990 | Imoto et al. |
| 5,917,981 A | | 6/1999 | Kovacic et al. |
| 5,930,439 A | | 7/1999 | Ojha et al. |
| 6,108,464 A | * | 8/2000 | Foresi et al. .................. 385/14 |
| 6,157,765 A | | 12/2000 | Bruce et al. |
| 6,366,730 B1 | | 4/2002 | Cappuzzo et al. |
| 6,389,209 B1 | * | 5/2002 | Suhir .......................... 385/129 |
| 6,501,895 B1 | | 12/2002 | Bloechl et al. |
| 6,553,170 B2 | | 4/2003 | Zhong et al. |
| 6,608,947 B2 | | 8/2003 | Margalit et al. |
| 6,618,537 B2 | | 9/2003 | Temkin et al. |
| 6,643,441 B1 | | 11/2003 | Pafchek et al. |
| 6,768,857 B2 | | 7/2004 | Bona et al. |
| 6,782,177 B2 | | 8/2004 | Bona et al. |

OTHER PUBLICATIONS

Barber, J.R. "Elasticity", *Solid Mechanics and Its Applications*, (1992).

Matthys, Lieven "An Analysis of an Engineering Model for the Thermal Mismatch Stresses at the Interface of a Uniformly Heat Two Layer Structure", *The International Society for Hybrid Microelectronics*, (1996).

* cited by examiner

*Primary Examiner*—William Phillip Fletcher, III

(57) ABSTRACT

Systems and methods for designing and fabricating multi-layer structures having thermal expansion properties are provided. One embodiment provides a multi-layer structure comprising a central layer, a first layer, and a second layer. The first layer is constrained to a first side of the central layer and has a first thickness. The first layer comprises a first material having a first value for a thermal expansion property. The second layer is constrained to a second side of the central layer and has a second thickness. The second layer comprises a second material having a second value for a thermal expansion property. The second thickness and the second value for the thermal expansion property and the first thickness and the first value for the thermal expansion property are such that, upon a change in temperature, the net change in the strain energy in the first layer and the net change in the strain energy in the second layer are substantially equal.

14 Claims, 9 Drawing Sheets

SYSTEMS AND METHODS FOR DESIGNING AND FABRICATING MULTI-LAYER STRUCTURES HAVING THERMAL EXPANSION PROPERTIES

CROSS-REFERENCE TO RELATED APPLICATIONS

This application is a divisional application of U.S. patent application Ser. No. 10/118,806 filed Apr. 9, 2002, now U.S. Pat. No. 7,095,933.

TECHNICAL FIELD

The present invention generally relates to multi-layer structures and, more particularly, to systems and methods for designing and fabricating multi-layer structures having thermal expansion properties.

BACKGROUND OF THE INVENTION

Optical communication systems are commonly used for exchanging information via visible and infrared light. For long distance communications, these light signals are often transmitted over a fiber optic cable. Planar lightwave circuits (PLCs) have been developed using semiconductor manufacturing technology to form planar optical waveguide structures on a planar substrate. PLCs are useful for transmitting and manipulating light signals over short distances. PLCs are typically formed as multi-layer structures by applying silicon dioxide ($SiO_2$) glass, and/or other materials, to one or more sides of a planar silicon (Si) substrate. Since the glass layers are often produced and/or annealed at high temperatures, any difference in thermal contraction (or expansion) between the various layers can cause warping, and possibly fracture, of these otherwise flat planar structures.

The problem of warping and/or fracture may be better understood with reference to various mechanical engineering terms. Stress is a force per unit area that acts on a material and tends to change the dimensions of that material by compressing it, stretching it, or causing it to shear. Stress is commonly denoted by the Greek letter sigma, "$\sigma$." Strain is a change in the dimensions of a body in response to an applied stress. Strain is typically expressed as the ratio of the distortion of a dimension to some undistorted dimension, and is represented by the Greek letter epsilon "$\epsilon$." Strain is said to be elastic when the deformation disappears as the stress is removed, and is said to be plastic when the deformation is permanent. Compressive strain occurs when the body dimension is reduced while tensile strain occurs when the dimension is increased.

Stress and strain are related by a material property called the modulus of elasticity, typically represented by the capital letter "E." The modulus of elasticity is the stress per unit elastic strain, expressed as a ratio between the stress placed on a material and the resulting strain. The most commonly encountered modulus of elasticity is referred to as Young's modulus; however, "bulk modulus" is also used. Another material property is the Poisson ratio, typically represented by the Greek letter nu, or "$\nu$." The Poisson ratio compares the transverse strain to the axial strain of a long specimen under an axial tensile or compressive stress at its ends. Stress and strain also combine to produce a "strain energy" equal to the work done during deformation in a manner analogous to the way energy is stored in a spring.

A change in the temperature of a material may result in a deformation of the dimensions of the material. This deformation can be regarded as a thermal strain. The ratio of the change of length per unit length (linear), or change of volume per unit volume (volumetric), for a change in temperature is called the "coefficient of thermal expansion" or CTE. Equivalently, the "thermal coefficient of expansion" or TCE, is typically represented by the Greek letter psi, or "$\gamma$." Thermal strains by themselves generally do not create stress. However, when a material is mechanically constrained from expanding or contracting as a result of the temperature change, it may undergo "thermal stress."

The general analysis of stress and strain within a multi-layer structure is generally so complicated as to be analytically intractable. See, for example, "*An Analysis of an Engineering Model for the Thermal Mismatch Stresses at the Interface of a Uniformly Heated Two Layer Structure*," by L. Matthys and G. De Mey, *The International Journal of Microcircuits and Electronic Packaging*, Volume 19, Number 3, third Quarter 1996 (ISSN 1063-1674), pp. 323-329, which hereby is incorporated by reference in its entirety into this document. However, where the structure is flat, and where the calculations are conducted far from edge-effect regions in accordance with Saint-Venant's principle, then stress calculations are more tractable and analytic solutions can sometimes be derived. See, for example, *Elasticity* by J. R. Barber, Kluwer Academic Publishers, 1999, ISBN 0-7923-1610-X (Pb), pp. 34-37, which is also incorporated by reference here.

Thermal stresses and/or strains may be particularly problematic for the operation and/or fabrication of planar optical waveguides. From an optical perspective, stress may degrade performance through a phenomenon called photoelasticity, which results in a problem called birefringence. Briefly, when an isotropic planar waveguide material, such as amorphous silica glass, is subjected to a stress in the plane of the waveguide, the index of refraction in the plane can become different from the index of refraction perpendicular to the plane. This difference produces an effect called "birefringence," in which an initially linearly polarized optical signal propagating in the plane splits into two polarized rays moving at different velocities, thereby resulting in degradation of the optical signal. Minimizing stress in the optical waveguide minimizes birefringence.

From a mechanical perspective, fracture and warping of the substrate may be problematic. Fracture may be problematic because the materials used in a planar lightwave circuit are often hard and rigid. Thus, rather than deforming plastically, they may fracture suddenly when they reach their ultimate stress limits. Also, they are typically stronger in compression than in tension, and thus tend to fracture easily when subjected to tensile stress.

Warping of the waveguide substrate makes it difficult to use photomasking and etching techniques to define waveguide features on the substrate because warped substrates cannot easily be contacted by flat photomask plates. Warping can include bowing of the substrate in a concave upward direction (dishing) or bowing in a convex upward direction (doming) if the stresses are uniform across the surfaces of the substrate, or a saddle shape (potato-chipping) if the stresses are nonuniform across the surfaces of the substrate. Furthermore, in certain situations (i.e., in high-performance systems in which the waveguide substrate is packaged after fabrication against a second flat substrate), any bumpiness (topography) on the surface of the substrate or any warping of the substrate makes such packaging difficult or impossible.

Thus, to minimize mechanical problems it is desirable to provide a structure, and a fabrication process, in which the substrate is flat (i.e., having low surface topography) and unwarped, the surface materials (especially the thick waveguide cladding materials) are in some degree of compressive stress, and the waveguide core materials experience a stress magnitude too small to produce significant birefringence.

U.S. Pat. No. 4,904,037 to Imoto et al. addresses these problems by providing a waveguide with thermal compensation layers. The device includes a silicon substrate, about 0.4 mm thick, with a thermally grown silicon dioxide film on each side, about 10 μm thick. The silicon dioxide layer on the top side of the substrate is used as a buffer layer and is overlaid with lithographically-defined and etched rectangular optical waveguide cores, about 8 μm thick by 10 μm wide. A silicon dioxide cladding layer (15 μm) is then formed on the front (top) side and a compensation layer (10 μm) having the same composition as the cladding layer may be formed on the rear (bottom) side, so that the total thickness of the set of layers on the front (top) side is 33 μm or less, while the total thickness of the set of layers on the backside is 10 μm or 20 μm. The front side (top side) set is therefore 1.65 to 3.3 times as thick as the back side (bottom side) set. This approach may be of limited usefulness because the topside and bottom side layers have equal coefficients of thermal expansion, and it requires the use of thick layers on the wafer bottom side. In particular, the thermal growth of a silicon dioxide layer 10 μm thick is an unduly lengthy and expensive process, and the growth and deposition of thick layers on the bottom side of the wafer are unduly expensive processes. Furthermore, this approach fails to address problems of warping during the fabrication process, but instead only addresses problems of warping at the end of the fabrication process.

U.S. Pat. No. 5,930,439 to Ohja, et al. describes a planar optical waveguide having at least two silicon dioxide cladding layers on a silicon substrate with at least one silicon dioxide core layer disposed between the cladding layers. The cladding layers have the same refractive index, while the core layer has a higher refractive index than the cladding layers. Ohja, et al. teach that, without doping the overcladding layer to match the CTE of the substrate, it is not possible to achieve polarization sensitivities below 0.1 nm. Ohja, et al. also teach that it is advisable to keep the CTE of the overcladding layer less than that of the substrate so that the overcladding layer stays in a state of compressive stress, a goal which conflicts with the goal of matching the CTE of the substrate. This approach implies an unstated process of engineering optimization in which slight compressive stress is built in to the overcladding layer. This approach fails to address problems of warping during the fabrication process, but instead addresses warping in the finished structure.

Thus, there is a need in the industry for optical waveguide structures that are at the same time economical to fabricate, low in birefringence, and that have substantial compressive stress in cladding layers to reduce fracture tendencies, have low substrate warping at critical points during fabrication, have low surface topography in the final structure, and have low substrate warping in the final structure to allow ease in packaging after fabrication.

SUMMARY OF THE INVENTION

The present invention provides systems and methods for designing and fabricating multi-layer structures having thermal expansion properties.

One embodiment of the present invention provides a multi-layer structure. Briefly described, one such multi-layer structure comprises a central layer, a first layer, and a second layer. The first layer is constrained to a first side of the central layer and has a first thickness. The first layer comprises a first material having a first value for a thermal expansion property. The second layer is constrained to a second side of the central layer and has a second thickness. The second layer comprises a second material having a second value for a thermal expansion property. The second thickness and the second value for the thermal expansion property and the first thickness and the first value for the thermal expansion property are such that, upon a change in temperature, the net change in the strain energy in the first layer and the net change in the strain energy in the second layer are substantially equal.

The present invention may also be viewed as providing a method of fabricating a multi-layer structure. Briefly, one such method comprises the steps of: providing a central layer; constraining a first layer to a first side of the central layer, the first layer having a first thickness and a first value for a thermal expansion property; and constraining a second layer to a second side of the central layer, the second layer having a second thickness and a second value for a thermal expansion property, the second thickness and the second value for a thermal expansion property and the first thickness and the first value for a thermal expansion property being such that, upon a change in temperature, the strain energy in the first layer and the strain energy in the second layer are substantially equal.

The present invention may further be viewed as providing a system for designing multi-layer structures having thermal expansive properties. Briefly described, one such system comprises a first portion of logic and a second portion of logic. The first portion of logic is configured to define a set of variables related to material properties of a central layer, a first layer, and a second layer in a multi-layer structure. The first layer and the second layer in the multi-layer planar structure are constrained to the central layer and the first layer and the second layer have different thickness and different coefficients of thermal expansion. The second portion of logic is configured to define, based on the set of variables, a mathematical representation of the strain energy in the first layer and the strain energy in the second layer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings where the components are not necessarily drawn to scale.

DETAILED DESCRIPTION

I. Overview

As stated above and described in more detail below, the present invention provides systems and methods for designing and fabricating multi-layer structures having thermal expansion properties. The systems and methods of the present invention enable the design and manufacture of multi-layer structures in which a flat and unwarped central layer (e.g., a substrate) is provided by balancing the strain energy at the top and bottom of the central layer, and more generally they enable the design and manufacture of a multi-layer structure in which a central layer is provided exhibiting a desired degree of curvature over a desired temperature range.

The notation used below is generally consistent with the notation in *Elasticity* by J. R. Barber, Kluwer Academic Publishers, 1999, ISBN 0-7923-1610-X (Pb), which is incorporated herein by reference in its entirety.

II. Multi-Layer Structure

Figure 1:
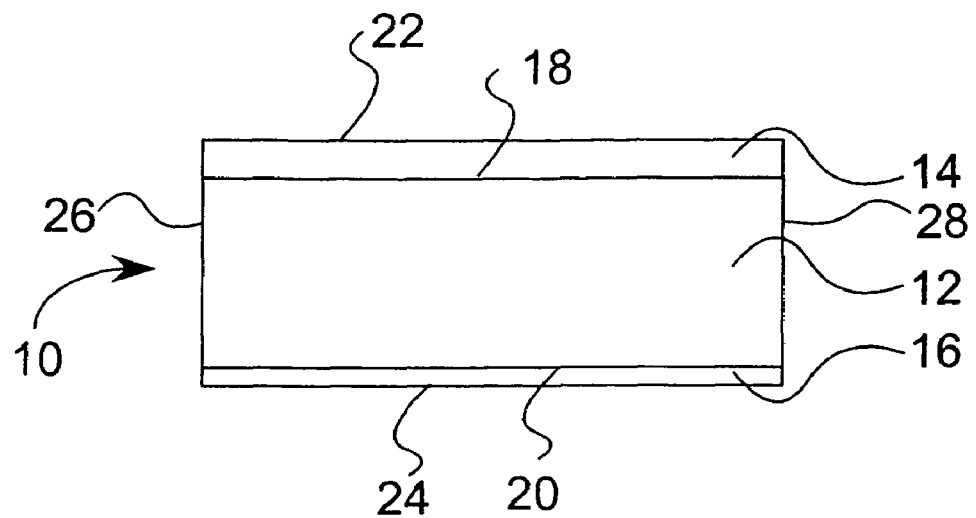
FIG. 1 is a sectional view of an embodiment of a three-layer structure according to the present invention.

FIG. 1 illustrates an exemplary embodiment of a multi-layer structure 10 including three layers, 12, 14, and 16. The central layer 12 may be, for example, a thermally-expansive substrate having thickness $t_{12}$, elastic modulus $E_{12}$, thermal expansion coefficient $\gamma_{12}$, and Poisson's ratio $v_{12}$. The top surface 18 and bottom surface 20 of the layer 12 are coated with material so as to form a top layer 14 and a bottom layer 16. The top layer 14 and bottom layer 16 may have thicknesses $t_{14}$ and $t_{16}$, respectively, Young's elastic moduli $E_{14}$ and $E_{16}$, respectively, thermal expansion coefficients $\gamma_{14}$ and $\gamma_{16}$, respectively, and Poisson's ratios $v_{14}$ and $v_{16}$, respectively. Some, or all, of these material properties may be the same in two or more layers. By way of example, all of the materials in the structure may be considered to have zero "intrinsic" stress. In other words, all of the stress and strain in the materials may be considered to be due to thermally-induced stress and strain, rather than due to any built-in stress and strain resulting from conditions and methods of forming of the materials.

During the fabrication of structure 10, the temperature of the structure 10 may be initially raised to a high temperature, $T_{high}$, so as to place the structure 10 in a stress-free state. As is known in the art, $T_{high}$ is preferably above the lowest temperature at which significant plastic flow will occur for all three of the layers 12, 14, and 16. As the structure 10 cools to a lower temperature, such as room temperature $T_{room}$, differences among the thermal contractions for each of the three materials, combined with the constraint of each layer by an adjacent layer, will introduce stresses and strains within all of the layers 12, 14, and 16, and at the interfaces between the three layers.

Layer 12 may be constrained by the top and bottom layers 14 and 16. Furthermore, the top and bottom layers 14 and 16 may have different thicknesses and may be formed from materials having different coefficients of thermal expansion. For example, if the layer 12 was not constrained by the top and bottom layers 14 and 16, then the layer 12 would undergo a temperature-induced, stress-free strain of $\epsilon_{012} = -\gamma_{12} * \Delta T$, where $\Delta T$ is the temperature difference, $(T_{high} - T_{room})$. If the layers 14 and 16 on top and bottom were uniform in composition and unconstrained by the central layer, they too would undergo temperature-induced, stress-free strains of $\epsilon_{014} = -\gamma_{14} * \Delta T$ and $\epsilon_{016} = -\gamma_{16} * \Delta T$. However, since each layer is actually constrained at its contact with the adjacent layer or layers, it actually undergoes an elastic stress and strain, instead of a pure temperature-induced strain without stress. These elastic stresses and strains result in the accumulation of strain energy within each of the layers 12, 14, and 16.

Significantly, the thicknesses ($t_{14}$ and $t_{16}$) and the coefficients of thermal expansion ($\gamma_{14}$ and $\gamma_{16}$) for layers 14 and 16 are designed such that, upon a change in temperature of structure 10, the net change in the strain energy in layer 14 and the net change in strain energy in layer 16 are within a pre-defined variance. In certain embodiments, the pre-defined variance is substantially non-zero. One of ordinary skill in the art will appreciate that, if the strain energy in layer 14 is different from the strain energy in layer 16, then the layer 12 warps as temperature changes. Conversely, if the layer 12 is initially flat, it stays flat if the thermally-induced strain energy in layer 14 is equal to the thermally-induced strain energy in layer 16. This condition of matched strain energies is a boundary condition to be met in order to produce a flat structure with no warping or bowing.

Figure 2:
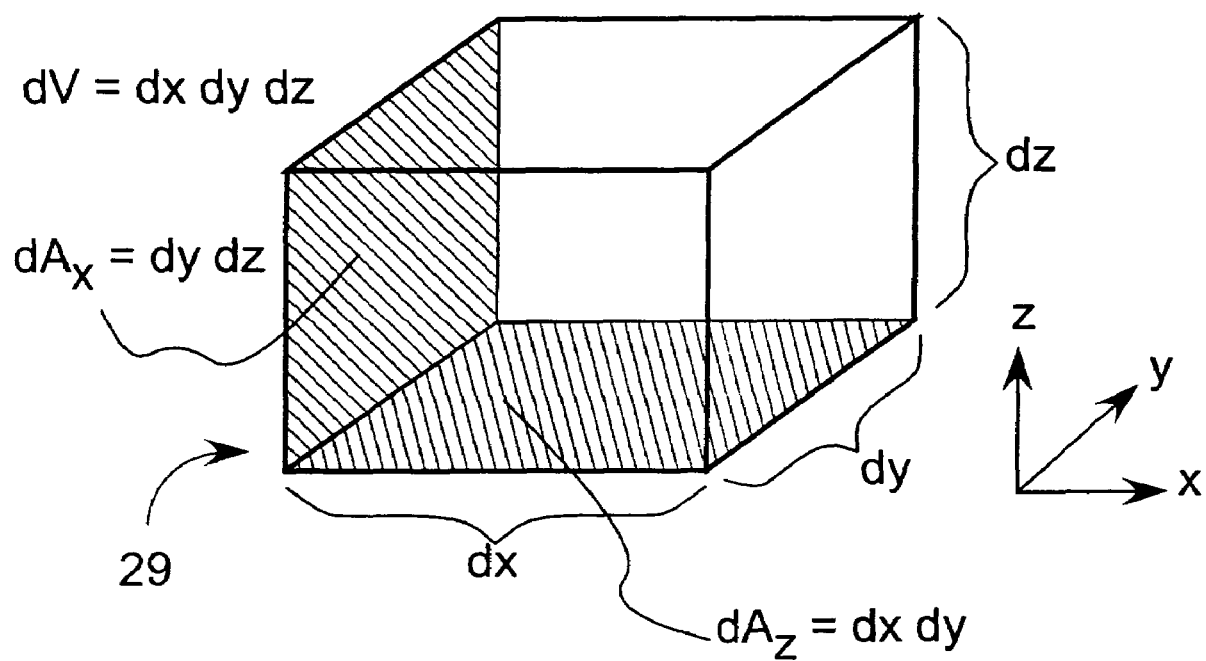
FIG. 2 is an isometric view of a unit volume from the structure in FIG. 1.

Referring to FIG. 2, this condition of matched strain energies may be described on an infinitesimal basis by considering an infinitesimally-thin column of material extending from upper surface 22 to lower surface 24 of structure 10. The column is far from the lateral edges 26 and 28 of structure 10 so that edge effects are minimal. This column experiences lateral compression or tension within the several layers 12, 14, and 16. In addition, there are sharp gradients in stress at the interfaces 18 and 20 due to the sudden change in materials properties at these interfaces. The net strain energy per unit area within the upper layer 14 is calculated by integrating the fiber stresses in the top layer 14 along one wall of the infinitesimally thin column, from its free upper surface 22 to its constrained bottom surface 18. The resulting force per infinitesimal width of the column in the top layer 14 is then integrated over the infinitesimal thickness of the column to give strain energy per infinitesimal cross sectional area. The strain energy can then be found by integrating over the whole area of the layer 12. However, if the material properties are uniform over the surface area of the layer 12, such integration is not necessary to solve for the condition of balanced strain energy.

Calculations are presented below with respect to the infinitesimal volume element 29 illustrated in FIG. 2, and assuming that the material properties are uniform over the surface area of the layer 12. The face of the volume element 29 parallel to the interfaces 18 and 20 is perpendicular to the z-axis and its infinitesimal surface area is given by $dA_z = dx\, dy$. Similarly, the face of the volume element perpendicular to the x-axis has an infinitesimal surface area given by $dA_x = dy\, dz$, while the face of the volume element perpendicular to the y-axis has an infinitesimal surface area given by $dA_y = dx\, dz$. Stresses within the element are assumed to be isotropic in the x and y directions. Since the top surface 22 of the infinitesimal column is unbounded, the fiber stresses in the z direction are zero. This condition of isotropic stress in a plane (the x and y directions), and zero stress out of the plane (the z direction) is referred to as "plane stress."

Using the model shown in FIG. 2, the force per infinitesimal width in layer 14 is calculated by taking, for example, the x-directed fiber stress $\sigma_x(z)$ and integrating it in the z direction over all area elements $dA_x(z)$ extending from a coordinate, $z_{18}$, at the interface 18 to a coordinate, $z_{22}$, at the free upper surface 22:

$$dF_{dy14} = \int_{z_{18}}^{z_{22}} \sigma_x(z) \, dA_x(z) = dy \int_{z_{18}}^{z_{22}} \sigma_x(z) \, dz \quad \text{(Equation 1)}$$

If layer 14 is of uniform composition, the substrate is flat, and the infinitesimal column is far from the edges 26 and 28, then the x-directed stress in layer 14 is uniform in the z direction so that Equation 1 simplifies to:

$$dF_{dy14} = \sigma_{14} t_{14} dy \quad \text{(Equation 2)}$$

It should be noted that the thickness $t_{14}=z_{22}-z_{18}$ varies with temperature and with the stresses $\sigma_x$ and $\sigma_y$. However, such variation in thickness is on the order of parts per million per degree Celsius, and is very much a second-order effect which can be neglected for all practical purposes here. Similarly, thickness variations of the other layers due to temperature can also be neglected. The strain energy per infinitesimal area can then be found by multiplying the left-hand side of Equation 2 by the thickness dx of the infinitesimal column:

$$dE_{dA_z14} = dF_{dy14} dx = \sigma_{14} t_{14} dx dy \quad \text{(Equation 3)}$$

The strain energy per infinitesimal area within the layer 12 can also be calculated by integration. The requirement that the layer 12 be flat implies that the stress within the layer and far from the edges 26 and 28 is uniform in the z direction. Half of the strain energy change in the layer 12 is due to the strain energy change imposed by the top layer 14, while half matches the change imposed by the bottom layer 16. Thus, arbitrarily setting z=0 at the center of the layer 12, we can integrate the full layer stress from the middle of the layer 12 to the upper surface 18 to give:

$$dF_{dy0-18} = \sigma_{12} \frac{t_{12}}{2} dy \quad \text{(Equation 4)}$$

and $$dE_{dA_z0-18} = dF_{dy0-18} dx = \sigma_{12} \frac{t_{12}}{2} dx dy \quad \text{(Equation 5)}$$

The strain energy changes given by Equations 3 and 5 are equal in magnitude and opposite in sign. Thus, the forces in Equations 3 and 5 are also equal and opposite, or:

$$dF_{dy14} dx = -dF_{dy0-18} dx \quad \text{(Equation 6)}$$

The condition of energy balance thus translates to a condition of infinitesimal force balance so that for uniform stresses in layers 12 and 14 we have:

$$\sigma_{14} t_{14} = -\sigma_{12} \frac{t_{12}}{2} \quad \text{(Equation 7)}$$

Similarly, for the interface surface 20:

$$\sigma_{16} t_{16} = -\sigma_{12} \frac{t_{12}}{2} \quad \text{(Equation 8)}$$

We can then set the left-hand sides of Equations 7 and 8 equal to one another to conclude that:

$$\sigma_{16} t_{16} = \sigma_{14} t_{14} \quad \text{(Equation 9)}$$

In addition to the conditions discussed above, a fundamental set of strain conditions is imposed by the initial temperature excursion from $T_{high}$ to $T_{room}$ and by the stable existence of the physical structure itself. Namely, the device must neither fall apart nor undergo plastic flow. More particularly, the difference of the strains between the constrained layers 12 and 14, or between the constrained layers 12 and 16, must equal the difference of the unrestrained temperature-induced strains in those layers, respectively, imposed by the temperature excursion, or:

$$\epsilon_{012} - \epsilon_{014} = \epsilon_{12} - \epsilon_{14} \quad \text{(Equation 10)}$$

and $$\epsilon_{012} - \epsilon_{016} = \epsilon_{12} - \epsilon_{16} \quad \text{(Equation 11)}$$

The relationship between stress and strain can be accounted for by considering Poisson's ratio for each material as, for example, is set forth in *Elasticity* by J. R. Barber, Kluwer Academic Publishers, 1999, ISBN 0-7923-1610-X (Pb), page 17, equations 1.38 to 1.40. Thus, in matrix form:

$$\begin{bmatrix} \varepsilon_{xx} \\ \varepsilon_{yy} \\ \varepsilon_{zz} \end{bmatrix} E = \begin{bmatrix} 1 & -v & -v \\ -v & 1 & -v \\ -v & -v & 1 \end{bmatrix} \begin{bmatrix} \sigma_{xx} \\ \sigma_{yy} \\ \sigma_{zz} \end{bmatrix} \quad \text{(Equation 12)}$$

where ν is Poisson's ratio and E is Young's modulus of elasticity, as discussed above. Symmetry in the x and y directions further requires that $\epsilon_{xx}=\epsilon_{yy}$ and $\sigma_{xx}=\sigma_{yy}$, while the lack of any externally-applied vertical load requires that $\sigma_{zz}=0$, so that Equation 12 can be reduced to the matrix equation $$\begin{bmatrix} \varepsilon_{xx} \\ \varepsilon_{xx} \\ \varepsilon_{zz} \end{bmatrix} E = \begin{bmatrix} 1 & -v & -v \\ -v & 1 & -v \\ -v & -v & 1 \end{bmatrix} \begin{bmatrix} \sigma_{xx} \\ \sigma_{xx} \\ 0 \end{bmatrix} \quad \text{(Equation 13)}$$

which further reduces to two equations in scalar form:

$$\epsilon = (1-v)\sigma \quad \text{(Equation 14)}$$

$$\epsilon_z = -2v\sigma \quad \text{(Equation 15)}$$

where $\sigma = \sigma_{xx} = \sigma_{yy}$ is the in-plane stress, $\epsilon = \epsilon_{xx} = \epsilon_{yy}$ is the in-plane strain, and $\epsilon_z = \epsilon_{zz}$ is the z-directed strain which can be neglected for practical purposes.

Based on the above analysis, it is then possible to specify a bottom material layer in terms of its thickness $t_{16}$, its thermal expansion coefficient $\gamma_{16}$, its modulus of elasticity $E_{16}$, and its Poisson's ratio $v_{16}$ such that the strain energy within layer 16 is equal to the strain energy within layer 14 for all temperatures below $T_{high}$ according to the following system of equations in Table I.

TABLE I

EQUATIONS FOR STRAIN ENERGY BALANCE IN A THREE-LAYER STRUCTURE

| EQUATION | PHYSICAL SIGNIFICANCE |
| --- | --- |
| $\epsilon_{014} = \gamma_{14} * \Delta T$ | Temperature offset of strain (no stress) |
| $\epsilon_{012} = \gamma_{12} * \Delta T$ | Temperature offset of strain (no stress) |
| $\epsilon_{016} = \gamma_{16} * \Delta T$ | Temperature offset of strain (no stress) |
| $\epsilon_{012} - \epsilon_{014} = \epsilon_{12} - \epsilon_{14}$ | The net strain in layer 14 is equal and opposite to the net strain in layer 12. |
| $\epsilon_{012} - \epsilon_{016} = \epsilon_{12} - \epsilon_{16}$ | The net strain in layer 16 is equal and opposite to the net strain in layer 12. |
| $t_{14} * \sigma_{14} = -t_{12}/2 * \sigma_{12}$ | The strain energy change in layer 14 is equal and opposite to half of the strain energy change in the substrate 12. |
| $t_{16} * \sigma_{16} = -t_{12}/2 * \sigma_{12}$ | The strain energy change in layer 16 is equal and opposite to half of the strain energy change in the substrate 12. |
| $\epsilon_{14} * E_{14} = \sigma_{14} * (1 - \nu_{14})$ | Fiber stress in the top layer (compressive for >0) |
| $\epsilon_{12} * E_{12} = \sigma_{12} * (1 - \nu_{12})$ | Fiber stress in the substrate (tensile for <0) |
| $\epsilon_{16} * E_{16} = \sigma_{16} * (1 - \nu_{14})$ | Fiber stress in the bottom layer (compressive for >0) |

More generally, the system of equations set forth in Table I can be solved for a variety of unknown variables when sufficient other variables are known. These solutions can be obtained using a variety of known techniques. For example, TK Solver 4.0 from Universal Technical Systems, 1220 Rock Street, Rockford, Ill. 61101 USA is a commercial software application that can be programmed to solve such systems of equations. The various material properties can also be restated as a function of temperature, or other variables, without adding undue complexity to the solution. In addition, a variety of other systems of equations can be derived using other conditions and/or constraints than those set forth above.

The following Table II provides one example of a solution for the system of equations shown above in Table I:

TABLE II

EXAMPLE SOLUTION OF EQUATIONS IN TABLE I

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
| --- | --- | --- | --- | --- |
| −875 | $\Delta T$ | | °K | Temperature change from zero-stress temperature to temperature of |
| 20 | $t_{14}$ | | μm | Top layer thickness |
| 525 | $t_{12}$ | | μm | Substrate thickness |
| | $t_{16}$ | 9.85 | μm | Bottom layer thickness |
| 7.21E10 | $E_{14}$ | | Pa | Elastic modulus, top layer |
| 1.7E11 | $E_{12}$ | | Pa | Elastic modulus, substrate |
| 7.21E10 | $E_{16}$ | | Pa | Elastic modulus, bottom layer |
| 1.5 | $\gamma_{14}$ | | ppm/°K | Thermal expansion coefficient, top layer |
| 2.5 | $\gamma_{12}$ | | ppm/°K | Thermal expansion coefficient, substrate |
| .5 | $\gamma_{16}$ | | ppm/°K | Thermal expansion coefficient, bottom layer |
| .16 | $\nu_{14}$ | | none | Poisson's ratio, top layer |
| .2 | $\nu_{12}$ | | none | Poisson's ratio, substrate |
| .16 | $\nu_{16}$ | | none | Poisson's ratio, bottom layer |
| | $\epsilon_{014}$ | −1312.5 | μstrain | Temperature offset of strain in top layer (no stress) |
| | $\epsilon_{012}$ | −2187.5 | μstrain | Temperature offset of strain in substrate (no stress) |
| | $\epsilon_{016}$ | −437.5 | μstrain | Temperature offset of strain in bottom layer (no stress) |
| | $\epsilon_{14}$ | 848.86 | μstrain | Resultant strain in top layer (compressive for >0) |
| | $\epsilon_{12}$ | −26.14 | μstrain | Resultant strain in substrate (tensile for <0) |
| | $\epsilon_{16}$ | 1723.86 | μstrain | Resultant strain in bottom layer (compressive for >0) |
| | $\sigma_{14}$ | 10610.76 | psi | Resultant stress in top layer (compressive for >0) |
| | $\sigma_{12}$ | −808.44 | psi | Resultant stress in substrate (tensile for <0) |
| | $\sigma_{16}$ | 21548.26 | psi | Resultant stress in bottom layer (compressive for >0) |

In the example model solution shown in Table II, the layer 12 is assigned thermal and mechanical properties that are typical for silicon wafer materials. The top layer 14 is assigned properties that are typical for fused silica, except that the thermal expansion coefficient is larger than that of fused silica, but less than that of silicon. The bottom layer 16 is given the same properties as the top layer, except that the thermal expansion coefficient is smaller than the top layer, and equal to a typical value for fused silica.

From the example in Table II, it can be seen that for a top layer 14 having a thickness of 20 μm, the resulting bottom layer thickness 16 is only 9.85 μm. Thus, even though the thermal expansion coefficients and the layer thicknesses of the top and bottom layers are substantially different, the structure 10 remains unwarped upon a change in temperature, ΔT. In addition, both the top and bottom layers 14 and 16 are in compression, with compressive loads of 10610.76 pounds per square inch ("psi") and 21548.26 psi, respectively. These high compressive loads provide good durability for the structure since the materials that are used for the top and bottom layer 14, 16 are typically stronger in compression than in tension. The substrate 12 is in tension with a tensile stress of −808.44 psi. Because the substrate is much thicker than the layers 14 or 16, the resulting magnitude of stress in the substrate 12 is much smaller than the magnitude of stress in layers 14 or 16.

Although the thickness $t_{16}$ is an output variable for the example problem shown in Table II, the thickness $t_{16}$ may alternatively be specified as an input variable in order to calculate some other variable as an output variable. The use of a computer program, such as TK Solver 4.0, is not necessary to solve the system of equations in Table I, and other techniques, such as use of matrix inversion routines, use of a procedural program written in any sufficiently general language for any general-purpose computer, or use of a spreadsheet program such as Microsoft Excel, can suffice if necessary. Further, a range of values having an upper or lower limit may be specified for one or more variables (such as maximum compressive and/or tensile stress) in order to provide a range of solutions which can then be analyzed for feasibility of fabrication.

Figure 3:
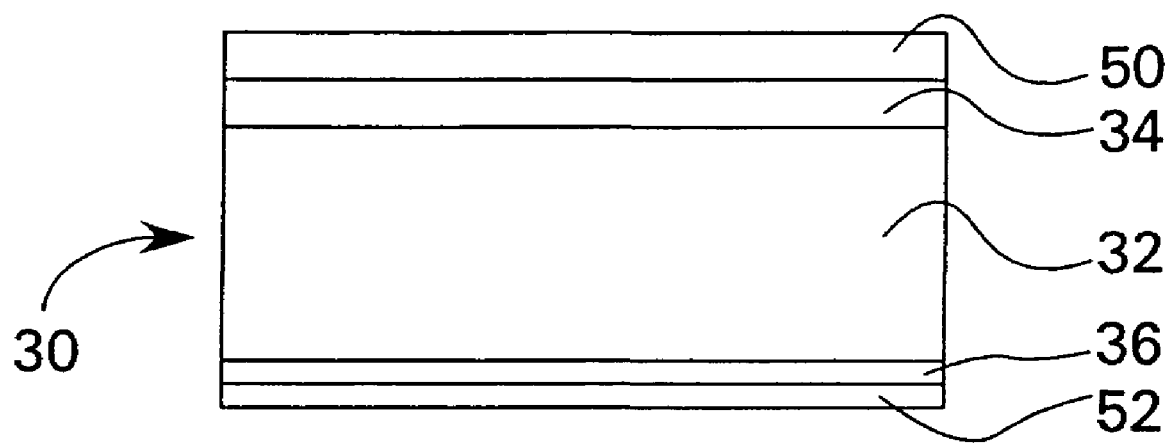
FIG. 3 is a sectional view of an embodiment of a five-layer structure according to the present invention.

FIG. 3 illustrates an embodiment of a five-layer structure 30 according to the present invention. In FIG. 3 the layer 32 is covered on its top surface 38 by a top layer 34 and upper layer 50. The layer 32 is also covered on its bottom surface 40 by a bottom layer 36 and a lower layer 52. By way of example, all of the materials in the structure are considered to have zero intrinsic strain.

By reasoning similar to that used above in connection with structure 10, in order for layer 32 to be unwarped, the thermally-induced strain energy obtained by integration through layers top and upper layers 34 and 50 must be equal to the thermally-induced strain energy obtained by integration through the bottom and lower layers 36 and 52. Therefore, by analogy to the derivations set forth above for the three-layer structure shown in FIG. 1, the following equations can be derived:

$$t_{34}\sigma_{34} + t_{50}\sigma_{50} = -\sigma_{32}t_{32}/2 \quad \text{(Equation 16)}$$

and $$t_{36}\sigma_{36} + t_{52}\sigma_{52} = -\sigma_{32}t_{32}/2 \quad \text{(Equation 17)}$$

In addition, the following four strain conditions can also be specified:

$$\epsilon_{032} - \epsilon_{050} = \epsilon_{32} - \epsilon_{50} \quad \text{(Equation 18)}$$

$$\epsilon_{032} - \epsilon_{034} = \epsilon_{32} - \epsilon_{34} \quad \text{(Equation 19)}$$

$$\epsilon_{032} - \epsilon_{036} = \epsilon_{32} - \epsilon_{36} \quad \text{(Equation 20)}$$

$$\epsilon_{032} - \epsilon_{052} = \epsilon_{32} - \epsilon_{52} \quad \text{(Equation 21)}$$

In Equations 18-21, $\epsilon_{032}$ is the stress-free temperature offset of strain of substrate 32, while $\epsilon_{034}$, $\epsilon_{036}$, $\epsilon_{050}$, and $\epsilon_{034}$ are the stress-free temperature offsets of strain for their respective layers in accordance with the numbering scheme of FIG. 3. Similarly, $\epsilon_{32}$, $\epsilon_{34}$, $\epsilon_{36}$, $\epsilon_{50}$, and $\epsilon_{52}$ are the strains resulting from the restraint imposed on each layer by the presence of the adjacent layers.

Thus, Table III presents a system of equations which describes the condition of balanced strain energies for the 5-layer system illustrated in FIG. 3.

TABLE III

EQUATIONS FOR STRAIN ENERGY BALANCE IN A FIVE-LAYER STRUCTURE

| EQUATION | PHYSICAL SIGNIFICANCE |
| --- | --- |
| $\epsilon_{050} = \gamma_{50} * \Delta T$ | Temperature offset of strain (no stress) |
| $\epsilon_{034} = \gamma_{34} * \Delta T$ | Temperature offset of strain (no stress) |
| $\epsilon_{032} = \gamma_{32} * \Delta T$ | Temperature offset of strain (no stress) |
| $\epsilon_{036} = \gamma_{36} * \Delta T$ | Temperature offset of strain (no stress) |
| $\epsilon_{052} = \gamma_{52} * \Delta T$ | Temperature offset of strain (no stress) |
| $\epsilon_{032} - \epsilon_{050} = \epsilon_{32} - \epsilon_{50}$ | The strain in layer 50 is equal and opposite to the strain in layer 32. |
| $\epsilon_{032} - \epsilon_{034} = \epsilon_{32} - \epsilon_{34}$ | The strain in layer 34 is equal and opposite to the strain in layer 32. |
| $\epsilon_{032} - \epsilon_{036} = \epsilon_{32} - \epsilon_{36}$ | The strain in layer 36 is equal and opposite to the strain in layer 32. |
| $\epsilon_{032} - \epsilon_{052} = \epsilon_{32} - \epsilon_{52}$ | The strain in layer 52 is equal and opposite to the strain in layer 32. |
| $t_{34} * \sigma_{34} + t_{50} * \sigma_{50} = -\sigma_{32} * t_{32}/2$ | The sum of strain energy changes in layers 34 and 50 is equal and opposite to half of the strain energy change in the substrate 32. |
| $t_{36} * \sigma_{36} + t_{52} * \sigma_{52} = -\sigma_{32} * t_{32}/2$ | The sum of strain energy changes in layers 36 and 52 is equal and opposite to half of the strain energy change in the substrate 32. |
| $\epsilon_{50} * E_{50} = \sigma_{50} * (1 - v_{50})$ | Fiber stress in layer 50 (compressive for >0) |
| $\epsilon_{34} * E_{34} = \sigma_{34} * (1 - v_{34})$ | Fiber stress in layer 34 (compressive for >0) |
| $\epsilon_{32} * E_{32} = \sigma_{32} * (1 - v_{32})$ | Fiber stress in the substrate (tensile for <0) |

TABLE III-continued

EQUATIONS FOR STRAIN ENERGY BALANCE IN A FIVE-LAYER STRUCTURE

| EQUATION | PHYSICAL SIGNIFICANCE |
|---|---|
| $\epsilon_{36} * E_{36} = \sigma_{36} * (1 - \nu_{36})$ | Fiber stress in layer 36 (compressive for >0) |
| $\epsilon_{52} * E_{52} = \sigma_{52} * (1 - \nu_{52})$ | Fiber stress in layer 52 (compressive for >0) |

It will be appreciated that the reasoning used to extend the analysis of structure 10 to that of structure 30 results in a system of simultaneous equations presented in Table III, which correspond to the condition of an unwarped layer 32. It will further be appreciated that the reasoning used to extend the analysis of structure 10 to that of structure 30 can be further extended in a straightforward manner to analyze any number of layers in a multi-layer structure, and to arrive at a system of simultaneous equations corresponding to the condition of an unwarped layer 32 for any such multi-layer structure. Furthermore, as with the system of equations presented in Table I, the use of a specific program, such as TK Solver 4.0, is not necessary to solve the system of equations in Table III.

The following Table IV provides one example of a solution for the system of equations shown above in Table III.

TABLE IV

EXAMPLE SOLUTION OF EQUATIONS IN TABLE III

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| −1000 | $\Delta T$ | | K | Temperature change from zero-stress temperature to temperature of |
| 25 | $t_{50}$ | | μm | Layer 50 thickness |
| 25 | $t_{34}$ | | μm | Layer 34 thickness |
| 675 | $t_{32}$ | | μm | Layer 32 thickness (substrate) |
| 0.1 | $t_{36}$ | | μm | Layer 36 thickness |
| | $t_{52}$ | 1.35 | μm | Layer 52 thickness |
| 7.21E10 | $E_{50}$ | | Pa | Elastic modulus, layer 50 |
| 7.21E10 | $E_{34}$ | | Pa | Elastic modulus, layer 34 |
| 1E9 | $E_{32}$ | | Pa | Elastic modulus, layer 32 (substrate) |
| 7.21E10 | $E_{36}$ | | Pa | Elastic modulus, layer 36 |
| 7.21E10 | $E_{52}$ | | Pa | Elastic modulus, layer 52 |
| 2 | $\gamma_{50}$ | | ppm/K | Thermal expansion coefficient, layer 50 |
| 2 | $\gamma_{34}$ | | ppm/K | Thermal expansion coefficient, layer 34 |
| 2.5 | $\gamma_{32}$ | | ppm/K | Thermal expansion coefficient, layer 32 (substrate) |
| 0.5 | $\gamma_{36}$ | | ppm/K | Thermal expansion coefficient, layer 36 |
| 0.5 | $\gamma_{52}$ | | ppm/K | Thermal expansion coefficient, layer 52 |
| 0.16 | $\nu_{50}$ | | none | Poisson' ratio, layer 50 |
| 0.16 | $\nu_{34}$ | | none | Poisson' ratio, layer 34 |
| 0.2 | $\nu_{32}$ | | none | Poisson' ratio, layer 32 (substrate) |
| 0.16 | $\nu_{36}$ | | none | Poisson' ratio, layer 36 |
| 0.16 | $\nu_{52}$ | | none | Poisson' ratio, layer 52 |
| | $\epsilon_{050}$ | −2000 | μstrain | Temperature offset of strain in layer 50 (no stress) |
| | $\epsilon_{034}$ | −2000 | μstrain | Temperature offset of strain in layer 34 (no stress) |
| | $\epsilon_{032}$ | −2500 | μstrain | Temperature offset of strain in layer 32 (substrate) (no stress) |
| | $\epsilon_{036}$ | −500 | μstrain | Temperature offset of strain in layer 36 (no stress) |
| | $\epsilon_{052}$ | −500 | μstrain | Temperature offset of strain in layer 52 (no stress) |
| | $\epsilon_{50}$ | 44.75 | μstrain | Resultant strain in layer 50 (compressive for >0) |
| | $\epsilon_{34}$ | 44.75 | μstrain | Resultant strain in layer 34 (compressive for >0) |
| | $\epsilon_{32}$ | −455.25 | μstrain | Resultant strain in layer 32 (substrate) (tensile for <0) |
| | $\epsilon_{36}$ | 1544.75 | μstrain | Resultant strain in layer 36 (compressive for >0) |
| | $\epsilon_{52}$ | 1544.75 | μstrain | Resultant strain in layer 52 (compressive for >0) |
| | $\sigma_{50}$ | 559.06 | psi | Resultant stress in layer 50 (compressive for >0) |

TABLE IV-continued

EXAMPLE SOLUTION OF EQUATIONS IN TABLE III

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| | $\sigma_{34}$ | 559.06 | psi | Resultant stress in layer 34 (compressive for >0) |
| | $\sigma_{32}$ | −82.82 | psi | Resultant stress in layer 32 (substrate) (tensile for <0) |
| | $\sigma_{36}$ | 19297.92 | psi | Resultant stress in layer 36 (compressive for >0) |
| | $\sigma_{52}$ | 19297.92 | psi | Resultant stress in layer 52 (compressive for >0) |

For the example solution shown in Table IV, the total thickness of the top set of layers (layer 34 plus layer 50) is 34.5 times the total thickness of the bottom set of layers (layer 36 plus layer 52). In addition, the material properties that are input for layers 36 and 52 are identical, and correspond to handbook values for thermally-grown, fused silica (silicon dioxide, or $SiO_2$) so that the layers 36 and 52 can be considered to comprise only a single layer of thermally-grown $SiO_2$ with a total thickness of only 1.45 μm. This thickness is well within the range of feasibility for atmospheric pressure oxidation of the silicon substrate 32 in steam. In contrast, U.S. Pat. No. 4,904,037 specifies an oxide thickness of 10 μm, and thus requires either infeasibly long oxidation times at atmospheric pressure, or the use of expensive and dangerous high pressure oxidation (HIPOX) procedures. For example, at 1200 degrees C. the calculated oxidation time for a 10 μm thick layer of $SiO_2$ thermally grown in steam is 127 hours, while for a layer 1.45 μm thick the oxidation time in the same conditions is only 2.6 hours.

The properties specified for layer 32 in Table IV are those of single-crystal silicon, while those specified for layers 34 and 50 are those of fused silica except that the CTE is higher than that of fused silica. Methods of forming layers such as 34 and 50 with a high CTE and with a controlled index of refraction are known, and for example are presented in U.S. Pat. No. 5,930,439.

It will be appreciated that the CTE for layers 34 and 50 is specified at 2.0 ppm/K, which is less than the CTE of the substrate 32 (specified as 2.5 ppm/K) by 20%. The resulting compressive stress in layer 34 and 50, at 559.06 psi, is at once both much less than the compressive stress of 19,297.92 psi in layers 36 and 52, and much greater than the moderate tension of −82.82 psi in the substrate. And yet the compressive stress in layers 36 and 52 is much less than the compressive strength of fused silica of 1.1 GPa=160,000 psi. In addition, the tensile stress in the substrate 32 is far less than the tensile strength of silicon of 1 GPa=150,000 psi.

The example described by FIG. 3 and Tables III and IV can thus be seen to provide a five-layer structure which exhibits substantial compression in the top and bottom sets of layers for good resistance to cracking, low substrate warping, and inexpensive fabrication because each layer in the bottom set of layers is thin and easy to fabricate.

IV. Planar Lightwave Circuit

Figure 4A:
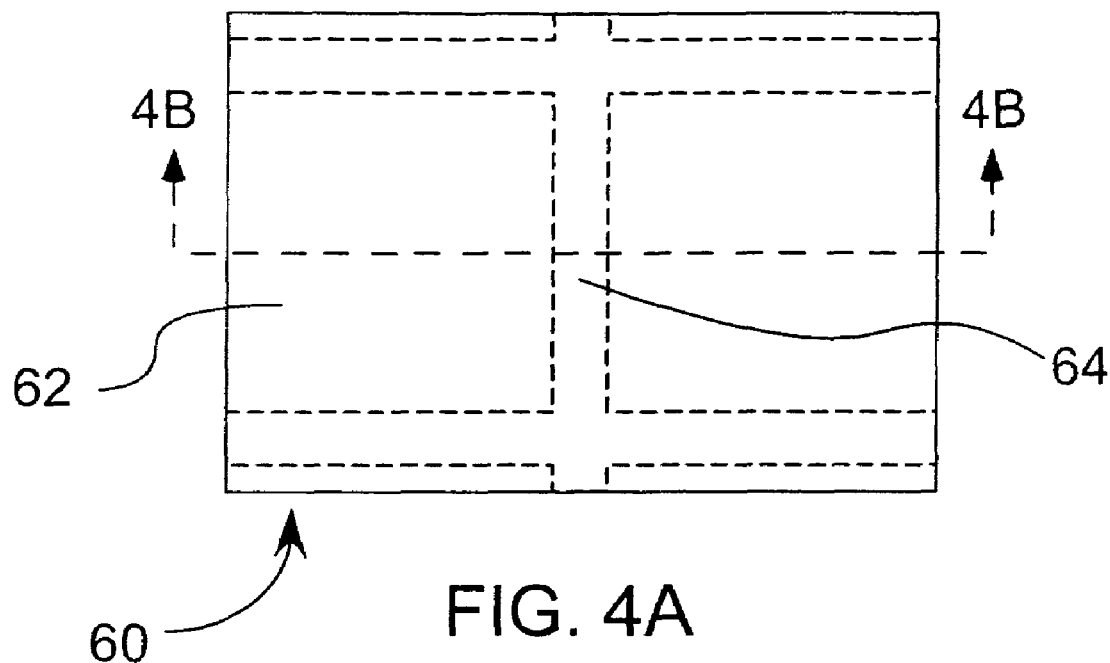
FIG. 4A is a top plan view of an embodiment of a planar lightwave circuit of the present invention that includes a multi-layer structure of FIG. 3.
Figure 4B:
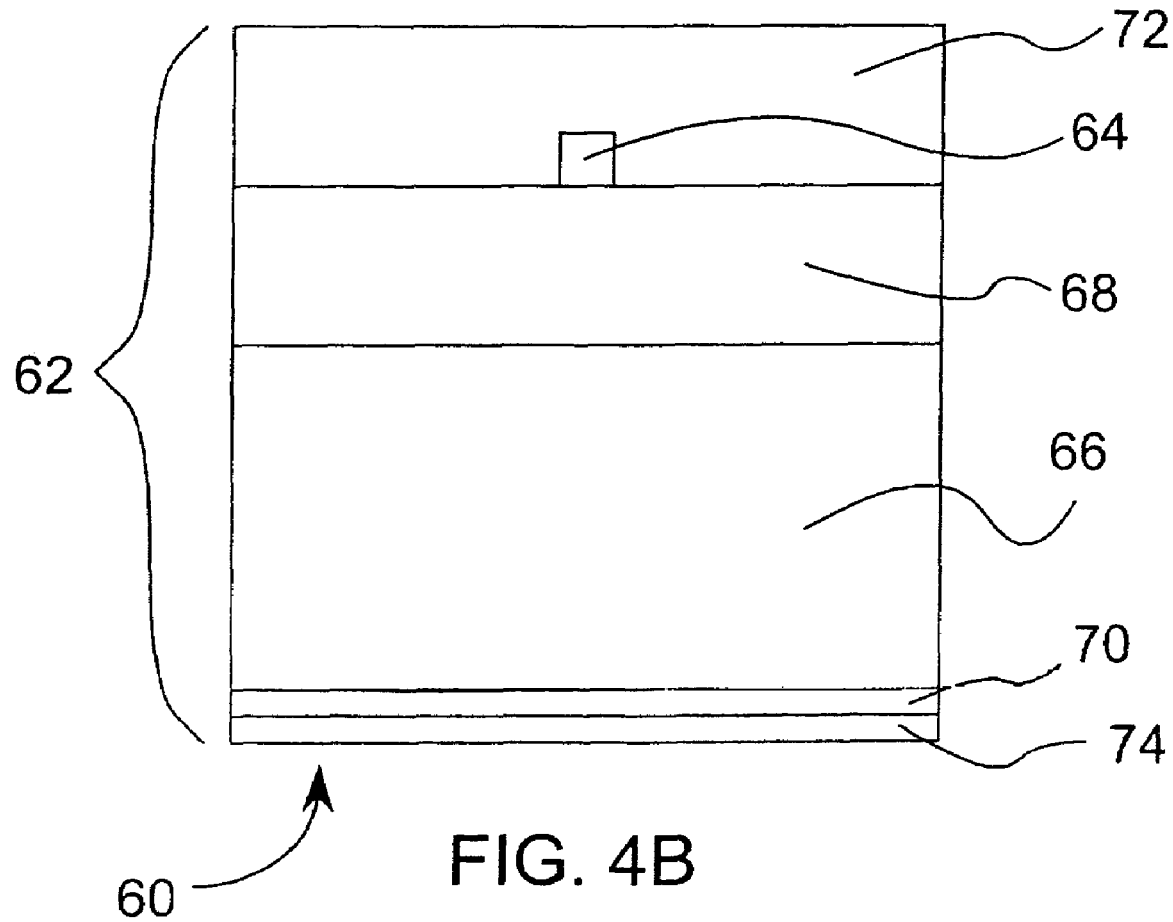
FIG. 4B is a cross sectional view of the planar lightwave circuit illustrated in FIG. 4A.

One of ordinary skill in the art will appreciate that multi-layer structure 10 and 30 may be implemented in a planar lightwave circuit. FIGS. 4A and 4B illustrate an embodiment of a planar lightwave circuit 60 implementing a multi-layer structure according to the present invention. Structure 62 is a five-layer structure with embedded waveguide core structures 64. The planar light circuit 60 is similar to the structure 30, but has the added feature of waveguide core structures 64 embedded between cladding layer 68 and cladding layer 72.

Planar lightwave circuit 60 may be designed for low birefringence in the waveguide core structures 64. For example, PLC 60 may be designed so that there is near-zero stress in the core regions. This condition is easy to design for, based on an example such as that in Table IV. In that example, the temperature offset of strain in layer 50 is $\epsilon_{o50}$=−2000 μstrain, and the resultant thermally-induced strain due to the constraint imposed by substrate 32 is $\epsilon_{50}$=44.75 μstrain. The difference is $\epsilon_{o50} - \epsilon_{50}$=(−2000+44.75)=−1955.25 μstrain. The strain levels are the same for layer 34.

If we chose the properties of layers 66, 68, 70, 72, and 74 in structure 62 to be the same as those of layers 32, 34, 36, 50, and 52 respectively in structure 30, we obtain the same levels of strain and stress in structure 62 as in structure 30, provided that waveguide core structures 64 displace a negligible portion of the area and volume of layer 72. As an example, if layer 72 is 25 μm thick and if waveguide core structures 64 comprise perpendicular intersecting optical core paths 10 μm wide and 10 μm thick on 250 μm centers, then waveguide core structures 64 occupy 7.8% of the area of layer 72, and they occupy 3.1% of the volume of layer 72. Thus, for practical purposes of calculation we can consider the volume of waveguide core structures 64 to be negligible.

Thus, if waveguide core structures 64 have a CTE consistent with the above-calculated −1955.25 μstrain over a temperature change of −1000 C as in Table IV, the stress in such waveguide cores is near zero. The required CTE for such core structures is then $\gamma_{64}$=(−1955.25 μstrain/−1000C) =1.95525E-6 per degree C., which is only 2.3% different from the CTE specified for layers 68 and 72. A value near $\gamma_{64}$=1.95E-6/C is thus preferred for low birefringence.

V. Fabrication Method

Referring to FIGS. 5A-5H, an embodiment of a method of fabricating a planar lightwave circuit 100 will be described. The method uses the logic of strain energy balance to build in low substrate warping at critical process steps of photolithography and planarization, and to build an unwarped finished device. In brief, and as described in more detail below, during the fabrication process the addition of stock to a layer by deposition or growth produces substrate warping, or the removal of stock from a layer produces substrate warping. The warping is then reduced by a further stock addition or removal technique, such as etching in a buffered solution of hydrofluoric acid (so-called, buffered oxide etch, or "BOE") or chemo-mechanical polishing (CMP); these techniques thicken or thin one or more of the stressed layers responsible for the warping and produce the desired balance of strain energies. It is a desirable feature of this method of fabrication that, even in the face of manufacturing variations which occur in practice, the desired flat substrate can be obtained by an increasing or reducing the thickness of one or more layers during the fabrication process. This feature advantageously allows for "manufacturability by design" as described in more detail below.

Figure 5A:
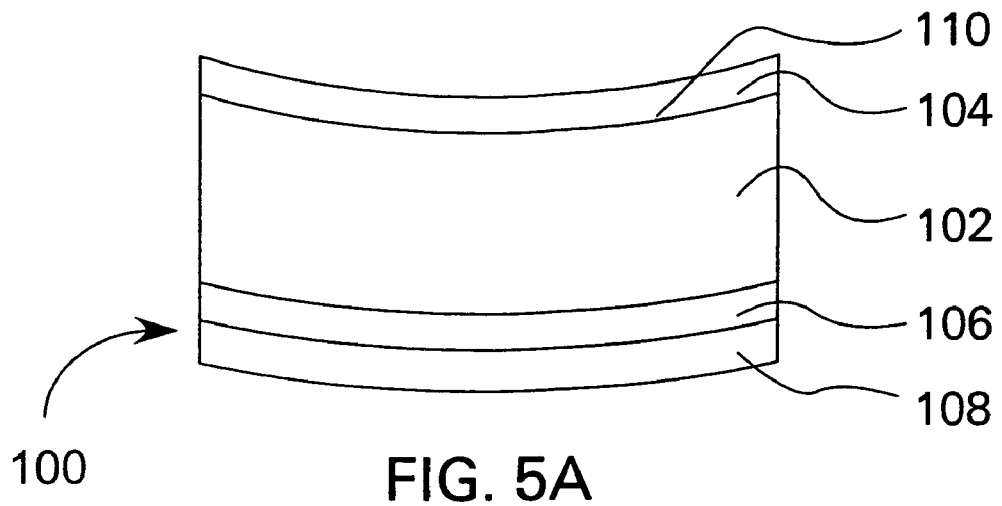
FIGS. 5A through 5H are sectional views illustrating a method of fabricating a multi-layer structure according to the present invention.

Referring to FIG. 5A, the fabrication process begins with a bare flat silicon wafer 102, having, for example, thickness of approximately 675 μm, diameter of approximately 150 mm, and a coefficient of thermal expansion (CTE) of approximately 2.5E-6/C. The surfaces of the wafer 102 are thermally-oxidized to form fused silica layers 104 and 106, each of equal thickness for example, 1.45 μm, and with a handbook CTE value of 0.5E-6/C. During and after the formation of the layers 104 and 106, the wafer 102 remains flat because the strain energy in layer 104 equals that in layer 106.

Next, a layer 108 of doped silicon dioxide glass is deposited on the bottom side of the wafer 102 using a known technique such as APCVD, LPCVD, TEOS, FHD, or the like, and using an appropriate known doping technique to obtain a desired CTE. The CTE of layer 108 is advantageously chosen to be 2.18E-6/C, and its thickness is advantageously chosen to be greater than 1 μm, for example 1.5 μm, for reasons which will be appreciated from the discussion presented in connection with Table V below. Because the CTE of layer 108 is less than that of silicon, after deposition and annealing of layer 108, it is in compression and the wafer 102 is dished upward as seen from its upper surface 110, as illustrated in FIG. 5A.

Figure 5B:
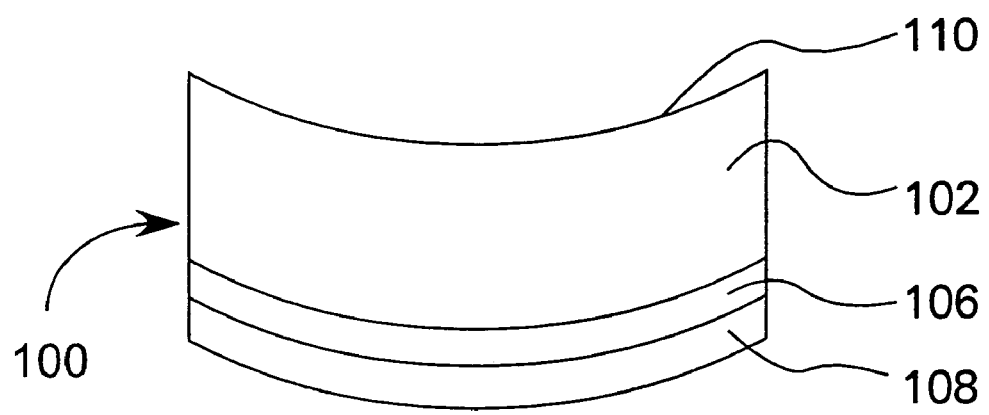

The oxide layer 104 is then stripped from the top surface 110 so that, as illustrated in FIG. 5B, the upward dishing of wafer 102 increases because the compressive strain energy in the oxide film 106 on the bottom surface is no longer balanced by the strain energy in removed layer 104.

Next, a layer 112 of doped silicon dioxide glass is deposited on the top surface 110 of wafer 102. Layer 112 is later to form a lower cladding layer in a finished planar lightwave circuit structure. The CTE of layer 112 is chosen to be 2.0E-6/C, its thickness is chosen to be 25 μm, and its index of refraction is chosen to be less than that of a subsequently deposited optical core layer 114.

Next an optical core layer 114 of doped silicon dioxide glass is deposited on top of layer 112. Layer 114 is later to be defined by photolithography and etching to form optical core structures 116. The CTE of layer 114 is chosen to be 1.95E-6/C for advantageous purposes of low birefringence as discussed above in connection with embodiment 60, its thickness is chosen to be 10 μm, and its index of refraction is chosen to be higher than that of surrounding cladding layers 112 and 118.

Figure 5C:
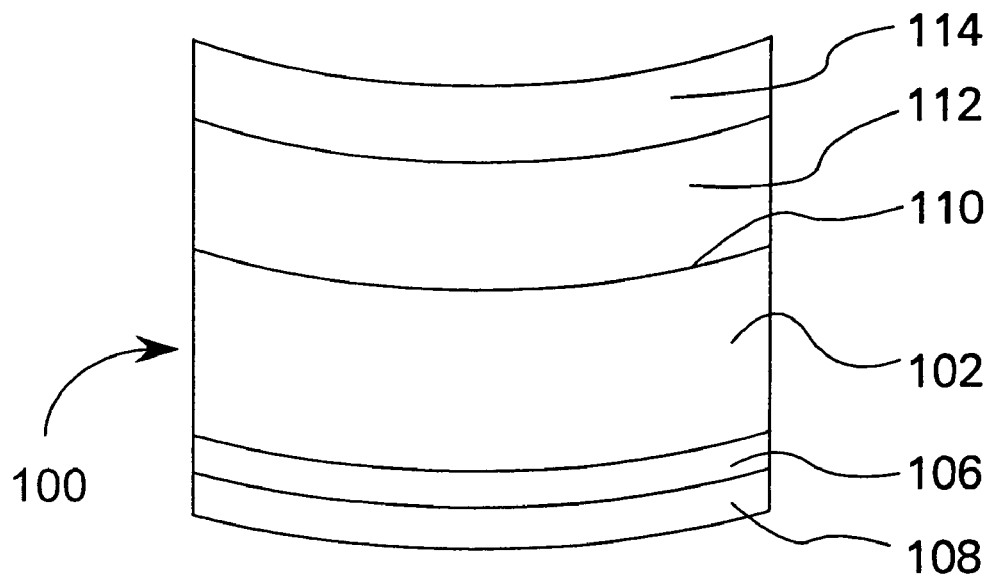

After the deposition and annealing of layers 112 and 114, the upward dishing of wafer 102 as illustrated in FIG. 5C is less than that as illustrated in FIG. 5B, because compressive strain energies in layers 112 and 114 partially balance compressive strain energies in layers 106 and 108.

Figure 5D:
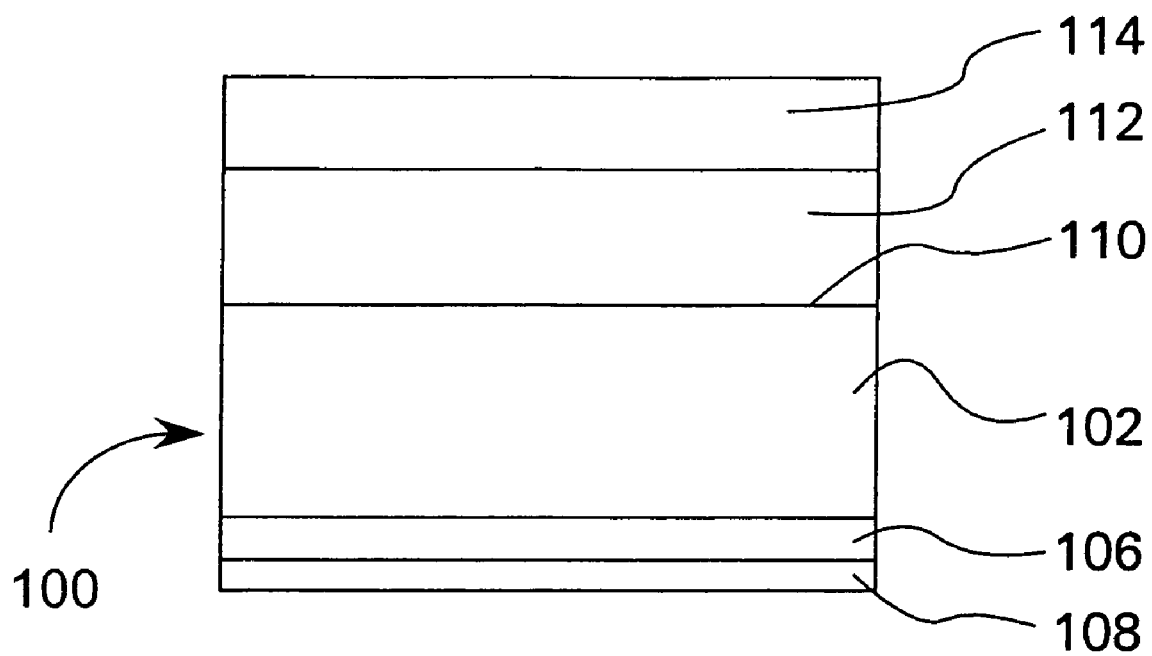

Next, the wafer is prepared for a photolithography step by removing sufficient thickness from layer 108 to balance the strain energy in top layers 112 and 114 with the strain energy in bottom layers 106 and 108, thereby producing a flat wafer 102 as illustrated in FIG. 5D. One of ordinary skill in the art will appreciate that, the 5-layer structure illustrated in FIG. 5D can be analyzed by solving the set of equations presented in Table III above. Table V below presents a calculated solution to this set of equations, which results in balanced strain energies and a flat wafer 102. The thicknesses and properties of layers 102, 112, 114, 106, and 108 as illustrated in FIG. 5D correspond to those of layers 32, 34, 50, 36, and 52 respectively as used in Table V. Table V thus presents a strain energy balance solution for the structure 100 at the fabrication step illustrated in FIG. 5D.

TABLE V

SOLUTION OF EQUATIONS IN TABLE III TO ACHIEVE
WAFER FLATNESS PRIOR TO PHOTOLITHOGRPAHY STEP

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| −1000 | $\Delta T$ | | K | Temperature change from zero-stress temperature to temperature of |
| 10 | $t_{50}$ | | μm | Layer 50 thickness |
| 25 | $t_{34}$ | | μm | Layer 34 thickness |
| 675 | $t_{32}$ | | μm | Layer 32 thickness (substrate) |
| 1.45 | $t_{36}$ | | μm | Layer 36 thickness |
| 1 | $t_{52}$ | | μm | Layer 52 thickness |
| 7.21E10 | $E_{50}$ | | Pa | Elastic modulus, layer 50 |
| 7.21E10 | $E_{34}$ | | Pa | Elastic modulus, layer 34 |
| 1E9 | $E_{32}$ | | Pa | Elastic modulus, layer 32 (substrate) |
| 7.21E10 | $E_{36}$ | | Pa | Elastic modulus, layer 36 |
| 7.21E10 | $E_{52}$ | | Pa | Elastic modulus, layer 52 |
| 1.95 | $\gamma_{50}$ | | ppm/K | Thermal expansion coefficient, layer 50 |
| 2 | $\gamma_{34}$ | | ppm/K | Thermal expansion coefficient, layer 34 |
| 2.5 | $\gamma_{32}$ | | ppm/K | Thermal expansion coefficient, layer 32 (substrate) |
| 0.5 | $\gamma_{36}$ | | ppm/K | Thermal expansion coefficient, layer 36 |
| | $\gamma_{52}$ | 2.18 | ppm/K | Thermal expansion coefficient, layer 52 |
| 0.16 | $\nu_{50}$ | | none | Poisson' ratio, layer 50 |
| 0.16 | $\nu_{34}$ | | none | Poisson' ratio, layer 34 |

TABLE V-continued

SOLUTION OF EQUATIONS IN TABLE III TO ACHIEVE
WAFER FLATNESS PRIOR TO PHOTOLITHOGRPAHY STEP

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| 0.2 | $v_{32}$ | | none | Poisson' ratio, layer 32 (substrate) |
| 0.16 | $v_{36}$ | | none | Poisson' ratio, layer 36 |
| 0.16 | $v_{52}$ | | none | Poisson' ratio, layer 52 |
| | $\epsilon_{050}$ | −1950 | µstrain | Temperature offset of strain in layer 50 (no stress) |
| | $\epsilon_{034}$ | −2000 | µstrain | Temperature offset of strain in layer 34 (no stress) |
| | $\epsilon_{032}$ | −2500 | µstrain | Temperature offset of strain in layer 32 (substrate) (no stress) |
| | $\epsilon_{036}$ | −500 | µstrain | Temperature offset of strain in layer 36 (no stress) |
| | $\epsilon_{052}$ | −2184.22 | µstrain | Temperature offset of strain in layer 52 (no stress) |
| | $\epsilon_{50}$ | 99.04 | µstrain | Resultant strain in layer 50 (compressive for >0) |
| | $\epsilon_{34}$ | 49.04 | µstrain | Resultant strain in layer 34 (compressive for >0) |
| | $\epsilon_{32}$ | −450.95 | µstrain | Resultant strain in layer 32 (substrate) (tensile for <0) |
| | $\epsilon_{36}$ | 1549.04 | µstrain | Resultant strain in layer 36 (compressive for >0) |
| | $\epsilon_{52}$ | −135.17 | µstrain | Resultant strain in layer 52 (compressive for >0) |
| | $\sigma_{50}$ | 1237.29 | psi | Resultant stress in layer 50 (compressive for >0) |
| | $\sigma_{34}$ | 612.66 | psi | Resultant stress in layer 34 (compressive for >0) |
| | $\sigma_{32}$ | −82.04 | psi | Resultant stress in layer 32 (substrate) (tensile for <0) |
| | $\sigma_{36}$ | 20319.10 | psi | Resultant stress in layer 36 (compressive for >0) |
| −1000 | $\sigma_{52}$ | −1773.16 | psi | Resultant stress in layer 52 (compressive for >0) |

The initial thickness of 1.5 µm chosen above for layer 108 may be thicker than the 1 µm thickness used in obtaining the above solution in Table V. Thus, layer 108 can be thinned to obtain this desired value. The amount of bowing at the process step illustrated in FIG. 5C is measured, and the silicon dioxide layer 108 is then thinned, for example, by etching in a buffered oxide etch. The bowing measurements and etching are then repeated until the wafer 102 becomes flat as illustrated in FIG. 5D. The sum of the thicknesses of layers 34 and 50 in Table V is 35 µm, while the sum of the thicknesses of layers 36 and 52 is 2.45 µm, so that the top set is fourteen (14) times as thick as the bottom set.

Figure 5E:
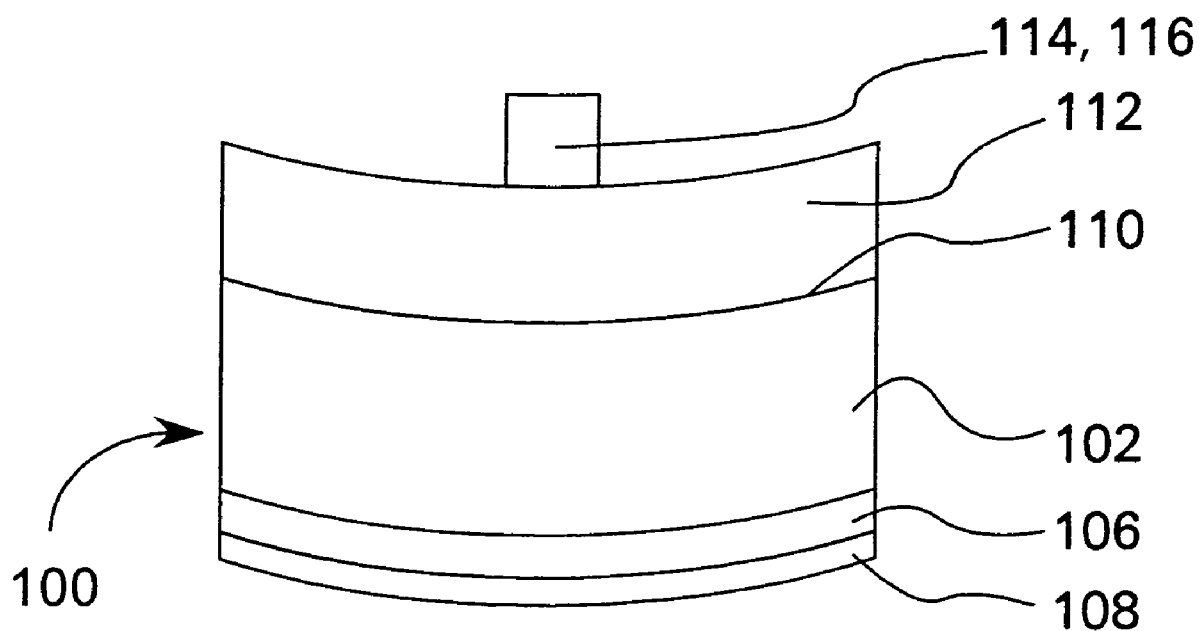

The flat wafer 102 is then suitable for use in automated wafer handling equipment such as wafer transport tracks, vacuum chucks, and contact mask aligners, for purposes of photoresist coating, photolithography, photoresist development, and chemical etching. By use of such techniques, waveguide core layer 114 is converted to multiple waveguide core structures 116 as illustrated in FIG. 5E. The etching of portions of layer 114 occurring between the steps of FIG. 5D and FIG. 5E removes the compressive strain energy stored in layer 114, and so the wafer 102 is again bowed upward at the step of FIG. 5E.

Next, an upper cladding layer 118 of doped silicon dioxide glass is deposited over the core structures 116 and the exposed portions of lower cladding layer 112. The CTE of layer 118 is chosen to be 2.02E-6/C, its thickness is chosen to be greater than 35 µm, and its index of refraction is chosen to be less than that of optical core layer 114. The strain energy in layer 118 after deposition and annealing is compressive, and so the thickness of layer 118 can be chosen to again create a flat wafer by balancing the compressive strain energy in layers 106 and 108, as illustrated in FIG. 5F.

Figure 5F:
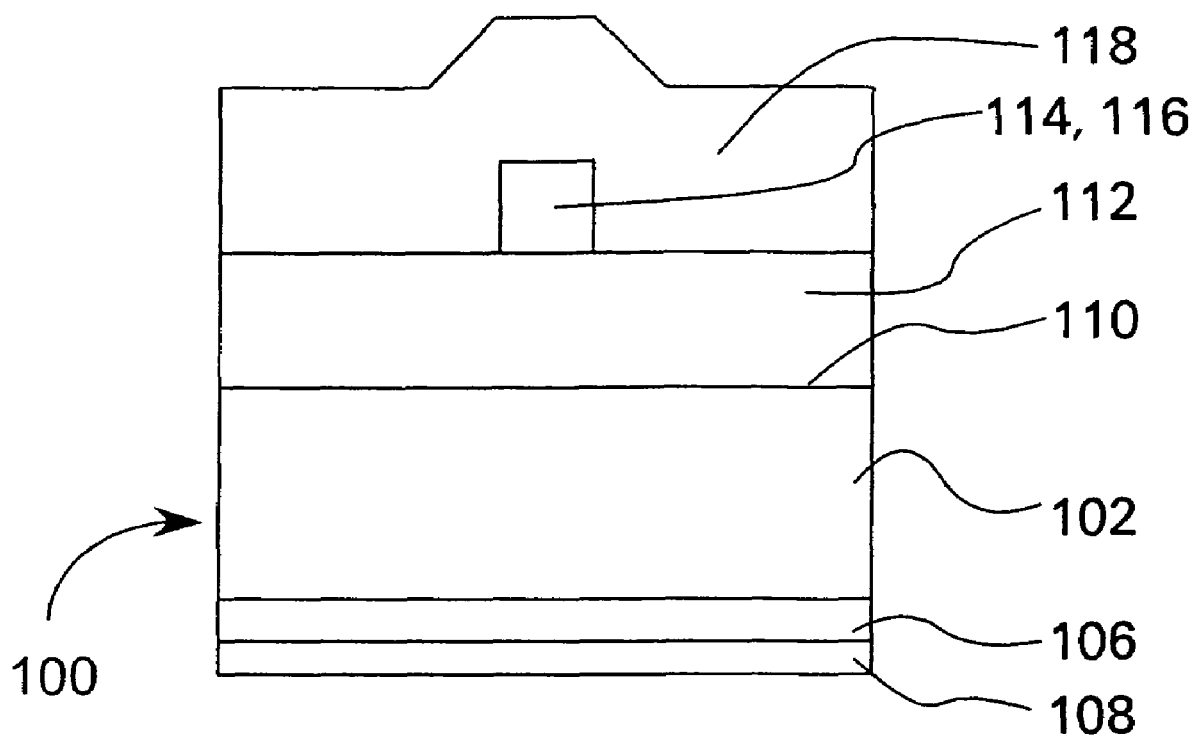

The 5-layer structure illustrated in FIG. 5F can be analyzed by solving the set of equations presented in Table III above. Table VI below presents a calculated solution to this set of equations which results in balanced strain energies and a flat wafer 102. The thicknesses and properties of layers 102, 112, 118, 106, and 108 as illustrated in FIG. 5D correspond to those of layers 32, 34, 50, 36, and 52 respectively as used in Table VI. Table VI thus presents a strain energy balance solution for the structure 100 at the fabrication step illustrated in FIG. 5F. It should be noted that lower layer 52 is in tension in the solution presented in Table VI. It is understood by those skilled in the art that tension in a thin layer such as layer 52 does not produce a high fracture probability as compared to equivalent tension would in a thicker layer, because the probability occurrence of a defect in a thin layer which would lead to stress concentration effects and subsequent fracture is small compared to the probability of such a defect occurring in a thicker layer.

TABLE VI

SOLUTION OF EQUATIONS IN TABLE III TO ACHIEVE
WAFER FLATNESS PRIOR TO CMP STEP

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| −1000 | $\Delta T$ | | K | Temperature change from zero-stress temperature to temperature of |
| 35 | $t_{50}$ | | μm | Layer 50 thickness |
| 25 | $t_{34}$ | | μm | Layer 34 thickness |
| 675 | $t_{32}$ | | μm | Layer 32 thickness (substrate) |
| 1.45 | $t_{36}$ | | μm | Layer 36 thickness |
| 1 | $t_{52}$ | | μm | Layer 52 thickness |
| 7.21E10 | $E_{50}$ | | Pa | Elastic modulus, layer 50 |
| 7.21E10 | $E_{34}$ | | Pa | Elastic modulus, layer 34 |
| 1E9 | $E_{32}$ | | Pa | Elastic modulus, layer 32 (substrate) |
| 7.21E10 | $E_{36}$ | | Pa | Elastic modulus, layer 36 |
| 7.21E10 | $E_{52}$ | | Pa | Elastic modulus, layer 52 |
| | $\gamma_{50}$ | 2.02 | ppm/K | Thermal expansion coefficient, layer 50 |
| 2 | $\gamma_{34}$ | | ppm/K | Thermal expansion coefficient, layer 34 |
| 2.5 | $\gamma_{32}$ | | ppm/K | Thermal expansion coefficient, layer 32 (substrate) |
| 0.5 | $\gamma_{36}$ | | ppm/K | Thermal expansion coefficient, layer 36 |
| 2.18 | $\gamma_{52}$ | | ppm/K | Thermal expansion coefficient, layer 52 |
| 0.16 | $\nu_{50}$ | | none | Poisson' ratio, layer 50 |
| 0.16 | $\nu_{34}$ | | none | Poisson' ratio, layer 34 |
| 0.2 | $\nu_{32}$ | | none | Poisson' ratio, layer 32 (substrate) |
| 0.16 | $\nu_{36}$ | | none | Poisson' ratio, layer 36 |
| 0.16 | $\nu_{52}$ | | none | Poisson' ratio, layer 52 |
| | $\epsilon_{050}$ | −2020.74 | μstrain | Temperature offset of strain in layer 50 (no stress) |
| | $\epsilon_{034}$ | −2000 | μstrain | Temperature offset of strain in layer 34 (no stress) |
| | $\epsilon_{032}$ | −2500 | μstrain | Temperature offset of strain in layer 32 (substrate) (no stress) |
| | $\epsilon_{036}$ | −500 | μstrain | Temperature offset of strain in layer 36 (no stress) |
| | $\epsilon_{052}$ | −2184.22 | μstrain | Temperature offset of strain in layer 52 (no stress) |
| | $\epsilon_{50}$ | 28.3 | μstrain | Resultant strain in layer 50 (compressive for >0) |
| | $\epsilon_{34}$ | 49.04 | μstrain | Resultant strain in layer 34 (compressive for >0) |
| | $\epsilon_{32}$ | −450.96 | μstrain | Resultant strain in layer 32 (substrate) (tensile for <0) |
| | $\epsilon_{36}$ | 1549.04 | μstrain | Resultant strain in layer 36 (compressive for >0) |
| | $\epsilon_{52}$ | −135.18 | μstrain | Resultant strain in layer 52 (compressive for >0) |
| | $\sigma_{50}$ | 353.51 | psi | Resultant stress in layer 50 (compressive for >0) |
| | $\sigma_{34}$ | 612.66 | psi | Resultant stress in layer 34 (compressive for >0) |
| | $\sigma_{32}$ | −82.04 | psi | Resultant stress in layer 32 (substrate) (tensile for <0) |
| | $\sigma_{36}$ | 20319.1 | psi | Resultant stress in layer 36 (compressive for >0) |
| −1000 | $\sigma_{52}$ | −1773.17 | psi | Resultant stress in layer 52 (compressive for >0) |

The sum of the thicknesses of layers 34 and 50 in Table VI is 60 μm, while the sum of the thicknesses of layers 36 and 52 is 2.45 μm, so that the top side layers are twenty-four (24) times as thick as the bottom side layers.

If layer 118 turns out to be a little too thick in practice so that the substrate 102 is domed upward, layer 108 can then be thinned a little to remove the dishing by removing the some of the tensile strain energy in layer 108. If layer 118 turns out to be a little too thin so that the substrate 102 is dished upward, first the tensile strain energy in layer 108 can be removed by entirely removing layer 108, causing the wafer to dish upward even further, and then some of the compressive strain energy in layer 106 can be removed by thinning layer 106, causing the substrate 102 to flatten.

If some surface topography can be tolerated in the portions of layer 118 sitting over waveguide core structures 116, the fabrication process can end at this point. However, if a flat top surface of layer 118 is desired for packaging purposes, the fabrication process continues.

Figure 5G:
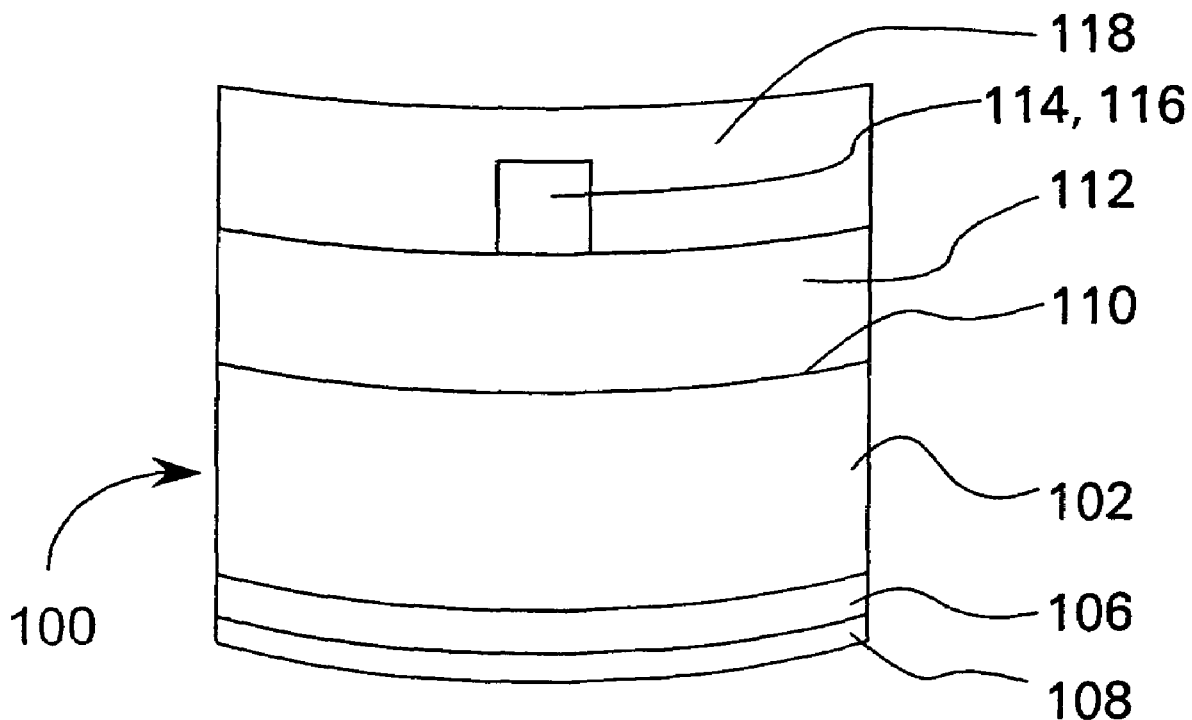

Because wafer 102 is again flat at the step illustrated in FIG. 5F, the flat bottom surface of layer 108 can be mounted on a flat chuck for polishing and grinding purposes, using mounting means including but not limited to vacuum, wax, tape, and epoxy. Once the bottom surface is mounted to a chuck, the upper surface of layer 118 can be planarized, the is, the surface topography can be reduced, advantageously by a processes of chemo-mechanical polishing (CMP) commonly used in the semiconductor industry, and the thickness of layer 118 can be reduced to a desired final value, for example 25 µm. The CMP process removes the compressive strain energy stored in the portions of layer 118 which are polished away, again introducing warping to wafer 102. This warping becomes evident when the wafer is removed from the polishing chuck, as illustrated in FIG. 5G.

Figure 5H:
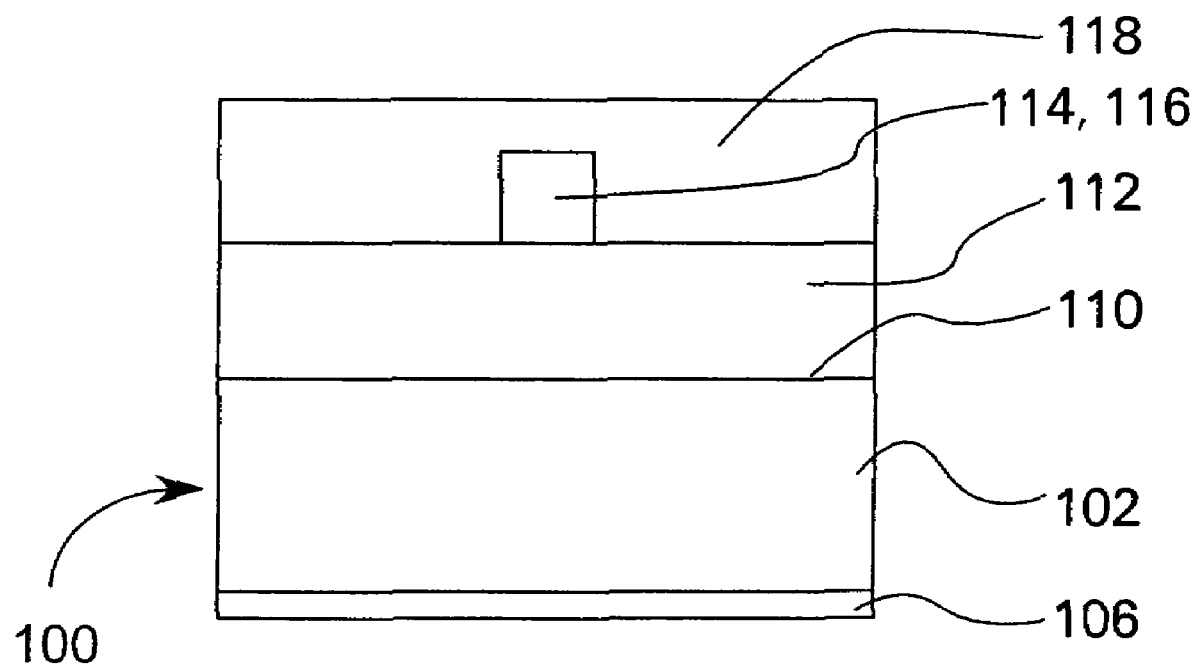

The final step in the fabrication process is to again remove wafer warping by removing material from the bottom layers 108 and 106. FIG. 5H illustrates the structure 100 at the end of the fabrication process. The full thickness of layer 108 has been removed, and part of the thickness of layer 106 has been removed to produce a final thickness for layer 106 of 1.34 µm. Table VII below presents a solution to the equations of Table III corresponding to the structure 100 at the final step in the fabrication process as illustrated in FIG. 5H. At this final step of the fabrication process, the thicknesses and properties of layers 102, 112, 118, AND 106 correspond to the thicknesses and properties of layers 32, 34, 50, AND 36 respectively in Table VIII. For purposes of calculation, layer 52 in Table VII has been assigned a thickness of 1E-9 µm, far less than one atomic diameter, so that the thickness of layer 52 is effectively zero and layer 52 contributes no significant effect to the results of the calculations.

TABLE VII

SOLUTION OF EQUATIONS IN TABLE III TO ACHIEVE WAFER FLATNESS AT THE END OF THE FABRICATION PROCESS

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| −1000 | $\Delta T$ | | K | Temperature change from zero-stress temperature to temperature of |
| 25 | $t_{50}$ | | µm | Layer 50 thickness |
| 25 | $t_{34}$ | | µm | Layer 34 thickness |
| 675 | $t_{32}$ | | µm | Layer 32 thickness (substrate) |
| | $t_{36}$ | 1.34 | µm | Layer 36 thickness |
| 1E−9 | $t_{52}$ | | µm | Layer 52 thickness |
| 7.21E10 | $E_{50}$ | | Pa | Elastic modulus, layer 50 |
| 7.21E10 | $E_{34}$ | | Pa | Elastic modulus, layer 34 |
| 1E9 | $E_{32}$ | | Pa | Elastic modulus, layer 32 (substrate) |
| 7.21E10 | $E_{36}$ | | Pa | Elastic modulus, layer 36 |
| 7.21E10 | $E_{52}$ | | Pa | Elastic modulus, layer 52 |
| 2.02 | $\gamma_{50}$ | | ppm/K | Thermal expansion coefficient, layer 50 |
| 2 | $\gamma_{34}$ | | ppm/K | Thermal expansion coefficient, layer 34 |
| 2.5 | $\gamma_{32}$ | | ppm/K | Thermal expansion coefficient, layer 32 (substrate) |
| 0.5 | $\gamma_{36}$ | | ppm/K | Thermal expansion coefficient, layer 36 |
| 2.18 | $\gamma_{52}$ | | ppm/K | Thermal expansion coefficient, layer 52 |
| 0.16 | $\nu_{50}$ | | none | Poisson' ratio, layer 50 |
| 0.16 | $\nu_{34}$ | | none | Poisson' ratio, layer 34 |
| 0.2 | $\nu_{32}$ | | none | Poisson' ratio, layer 32 (substrate) |
| 0.16 | $\nu_{36}$ | | none | Poisson' ratio, layer 36 |
| 0.16 | $\nu_{52}$ | | none | Poisson' ratio, layer 52 |
| | $\epsilon_{050}$ | −2020.74 | µstrain | Temperature offset of strain in layer 50 (no stress) |
| | $\epsilon_{034}$ | −2000 | µstrain | Temperature offset of strain in layer 34 (no stress) |
| | $\epsilon_{032}$ | −2500 | µstrain | Temperature offset of strain in layer 32 (substrate) (no stress) |
| | $\epsilon_{036}$ | −500 | µstrain | Temperature offset of strain in layer 36 (no stress) |
| | $\epsilon_{052}$ | −2184.22 | µstrain | Temperature offset of strain in layer 52 (no stress) |
| | $\epsilon_{50}$ | 33.45 | µstrain | Resultant strain in layer 50 (compressive for >0) |
| | $\epsilon_{34}$ | 54.2 | µstrain | Resultant strain in layer 34 (compressive for >0) |
| | $\epsilon_{32}$ | −445.8 | µstrain | Resultant strain in layer 32 (substrate) (tensile for <0) |
| | $\epsilon_{36}$ | 1554.2 | µstrain | Resultant strain in layer 36 (compressive for >0) |
| | $\epsilon_{52}$ | −130.03 | µstrain | Resultant strain in layer 52 (compressive for >0) |

TABLE VII-continued

SOLUTION OF EQUATIONS IN TABLE III TO ACHIEVE
WAFER FLATNESS AT THE END OF THE FABRICATION PROCESS

| INPUT VARIABLE VALUE | VARIABLE NAME | OUTPUT VARIABLE VALUE | PHYSICAL UNIT OF VARIABLE | PHYSICAL SIGNIFICANCE OF VARIABLE |
|---|---|---|---|---|
| | $\sigma_{50}$ | 417.89 | psi | Resultant stress in layer 50 (compressive for >0) |
| | $\sigma_{34}$ | 677.04 | psi | Resultant stress in layer 34 (compressive for >0) |
| | $\sigma_{32}$ | −81.11 | psi | Resultant stress in layer 32 (substrate) (tensile for <0) |
| | $\sigma_{36}$ | 20386.69 | psi | Resultant stress in layer 36 (compressive for >0) |
| | $\sigma_{52}$ | −1705.57 | psi | Resultant stress in layer 52 (compressive for >0) |

The sum of the thicknesses of layers 34 and 50 in Table VII is 50 μm, while the sum of the thicknesses of layers 36 and 52 is 1.34 μm, so that the top side layers are thirty-seven (37) times as thick as the bottom side layers.

In Table VII, the temperature offset of strain in layer 50 is $\epsilon_{o50}$=−2020.74 μstrain, and the resultant thermally induced strain due to the constraint imposed by substrate 32 is $\epsilon_{50}$=33.45 μstrain. The difference is $\epsilon_{o50}-\epsilon_{50}$=(−2020.74+33.45)=−1987.29 μstrain, implying that the best choice for the CTE of layer 114 for low birefringence would have been 1.98729E-6/C rather than the value of 1.95E-6/C used above. However, since the chosen value differs from the optimal value by only 1.8%, only minor process adjustments to the CTE value and layer thicknesses are needed to produce minimal birefringence.

It will be appreciated that the above-described fabrication process allows for manufacturability by design in two respects. First, the certainty that the wafer 102 will warp during fabrication is allowed for, and this certainty is accounted for in the design of both the structure and the fabrication process, in such a manner that warping is reduced to non-problematic magnitude at critical stages during the fabrication process. The method of fabricating a multi-layer structure (such as a planar lightwave circuit) described above, avoids the warping problem by adding or removing material from the outermost layers at various stages in the process so as to produce low warping when needed, even if the calculated values for CTEs and layer thicknesses are somewhat different from actual process values. Second, the time and cost for applying different layers can also be considered in optimizing the design process so as to minimize the overall cost of the structure by, for example, minimizing polishing or etching while still achieving the appropriate flatness when needed. It will be appreciated that, without the use of strain energy balance considerations, the design of multi-layer structures including planar lightwave circuits, and the design of processes for their fabrication, is very much a trial and error process as evidenced, for example, by the experimental methods described in U.S. Pat. Nos. 4,904,037 and 5,930,439.

It will be appreciated that the principles of strain energy balance set forth herein can be applied at any stage of other fabrication processes, including fabrication processes for structures other than planar lightwave circuits.

The examples described above have considered results obtained from the three-layer calculations of Table I and the five-layer calculations of Table III. It will be appreciated that these methods can be extended to any number of uniform layers on each surface of the substrate through an extension of the reasoning that was used to extend that analysis from three layers to five layers. It will also be appreciated that if graded layers are used, rather than layers with uniform properties, the principles considered in deriving Equation 1 still apply, and the condition of balanced total strain energy also still applies, so that specific structures, methods of fabrication, and methods of calculation can be developed based on integration of material properties and fiber stresses through the thickness of each layer. The corresponding solutions for cases where the properties of any layer vary are, therefore, also within the spirit and scope of the present invention. In the general case where layers with graded properties are used, each layer can be considered to have a set of thermal expansion properties rather than to have a single thermal expansion coefficient, a single elastic modulus, and a single Poisson ratio. The set of thermal expansion properties can comprise, for example, a graded thermal coefficient of expansion, a graded elastic modulus, and a graded Poisson ratio.

The above structures, fabrication methods, and design methods have considered layers exhibiting thermal strain but exhibiting zero intrinsic stress. It will be appreciated that the logic of strain energy balance can also be applied to structures having layers exhibiting intrinsic stress, even when such stress is independent of temperature. For example, the strain energy in a thick layer exhibiting low intrinsic stress on the top side of a substrate can be balanced by introducing a thin layer exhibiting high intrinsic stress on the bottom side of a substrate. Strain energy contributions due to intrinsic stress can also be balanced by introducing a set of layers in which some materials having negative CTEs balance other materials having positive CTEs. Alternatively, strain energy contribution due to intrinsic stress can be balanced by introducing layers having a positive CTE in a manner that balances the strain energy contribution of the intrinsic stress at a specific temperature, so that, even when stain energy in such layers cannot be balanced over all temperatures, optimally balanced strain energies can be achieved over a temperature range desired for fabrication, shipping, and use.

It will be further appreciated that one or more metrics for quantifying the advantages of the present invention is desirable. One useful metric is the amount of substrate bow B, which can be quantified as the deflection of the substrate in an upward or downward direction. This metric is closely related to the radius of curvature R of the substrate, which can easily be measured using a pair of reflected laser beams, (e.g., using the FLX-2320 Thin Film Stress Measurement system from Tencor Instruments). When the bow is much smaller than the radius of curvature, the bow can be related to the radius of curvature with good accuracy as $R=W^2/(8B)$, where W is the width of the substrate between the points where it rests on a flat surface.

The curvature C of the substrate is given in the angular change of the normal to the substrate per unit length along the curved substrate. Since there are $2\pi$ radians in a circle, and since the circumference of a circle of radius R is $2\pi R$, the curvature of a circle is simply $2\pi/(2\pi R)=1/R$. Therefore, for a trace along a nearly-flat substrate considered as coincident with a circle of radius R, the curvature is simply $C=1/R$.

Thus, the curvature C can be expressed in dimensions of angle per unit length (e.g., in radians per meter or degrees per centimeter) and is related to the bow B by $C=8B/W^2$. Any change in curvature C is linearly related to a change in bow B, and is inversely related to a change in radius of curvature R.

For example, if a substrate such as a wafer of silicon has a maximum width W=150 mm and is initially so flat that no upward or downward bowing can be measured, it can then be considered to be perfectly flat. The curvature of the substrate is zero and the radius of curvature is infinite. During a subsequent change in condition, for example a temperature change, the substrate may develop some degree of warping so that the center deflection is, for example, B=25 μm upward, leaving the substrate domed upward. The curvature C is then found as:

$$C=8B/W^2=8\times25\times10^{-6}\,m/(150\times10^{-3}\,m)^2=0.0089$$
radians/meter and the radians curvature is:

$$R=1/C=112.5 \text{ meters.}$$

If the substrate has some initial bow $B_0$, the difference $\Delta B=B_1-B_0$ gives a measure of the change in the substrate during the change in condition, but this measure is dependent on the width W of the substrate and increases as the square of W. However, the change in curvature $\Delta C=8\Delta B/W^2$ is independent of the width of the substrate.

As another example, if the change in bow B for a temperature excursion of $\Delta T=100$ degrees Celsius is specified as $\Delta B_{max}=5$ μm for a substrate width of W=3 cm, then the temperature coefficient of bow is $\Delta B_{max}/100C=0.05$ μm/C, but it must be remembered that this temperature coefficient depends on the width W of the substrate and so is not a generalized metric, while the change in curvature $\Delta C$ for a change in temperature $\Delta T$ is independent of the substrate width W and so provides a generalized metric. For this example, the maximum allowed change in curvature $\Delta C_{max}$ over the range of $\Delta T=100C$ is:

$$\Delta C_{max}=8\Delta B max/W^2=5\times10^{-6}\,m/(3\times10^{-2}\,m)^2=0.044$$
radians/meter and the temperature coefficient of curvature (TCC) provides an additional metric which can be calculated for this example as:

$$TCC_{max}=\Delta C_{max}/\Delta T=0.0444 \text{ radians/meter/}$$
$$100C=0.00044 \text{ radians/m/C.}$$

If the curvature C of a substrate is small, this is an indication that good flatness of the substrate has been obtained. For the case of balanced strain energies considered in the present invention, and for the case where a flat substrate is desired, a small curvature C is an indication that the methods of the invention have been successfully implemented. Also for the present invention, if the TCC is small, this is an indication that the changes in strain energy with temperature on both surfaces of the substrate are nearly equal and, either for the case where a flat substrate is desired or for the case where a substrate with a specified degree of curvature is desired, is an indication that the methods of the invention have been successfully implemented.

VI. Multi-Layer Structure Design System

Figure 6:
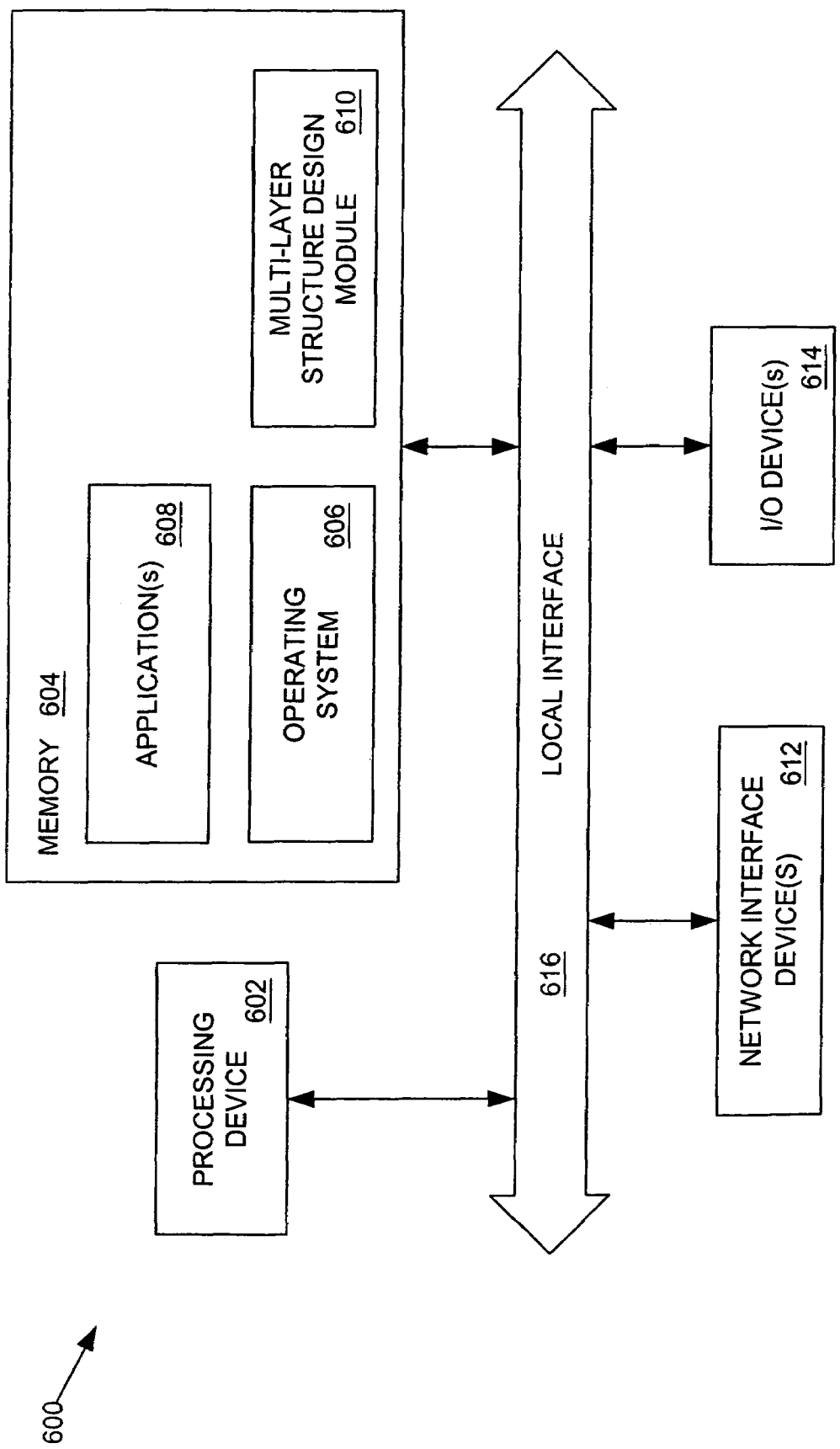
FIG. 6 is a schematic diagram of an embodiment of a multi-layer structure design system of the present invention for designing and fabricating the structures described in FIGS. 1-5H.

The systems and methods of the present invention described above for designing and fabricating multi-layer structures having thermal-expansive properties may be embodied within a computer program. FIG. 6 is a block diagram of a multi-layer structure design system 600 of the present invention that includes a multi-layer structure design module 610. In general, multi-layer structure design module 610 enables a user to design the multi-layer planar structures described above. For example, multi-layer structure design module 610 may enable a user to design the materials parameters for a three-layer structure 10 (FIG. 1) and a five-layer structure 30 (FIG. 3). One of ordinary skill in the art will appreciate that multi-layer structure design module 610 may also be used to design other structures having any of a number of layers.

Referring to FIG. 6, multi-layer structure design system 600 may comprise a processing device 602, memory 604, one or more input/out devices 612, and one or more network interface devices 614 interconnected via a local interface 616. Memory 604 may comprise an operating system 606, one or more applications 608, and a multi-layer structure design module 610. One of ordinary skill in the art will appreciate that multi-layer structure design system 600 may comprise additional components not illustrated in FIG. 6. Furthermore, in some embodiments, multi-layer structure design system 600 may not include all of the components illustrated in FIG. 6. For instance, multi-layer structure design system 600 may include a network interface device 612 only in situations where connectivity to an external communication network is desirable. As another example, multi-layer structure design system 600 may also be implemented without an operating system 606 and/or applications 608.

Referring again to FIG. 6, the various components of multi-layer structure design system 600 will be described. Local interface 616 may be, for example but not limited to, one or more buses or other wired or wireless connections. Local interface 616 may comprise additional elements, which are omitted for simplicity, such as controllers, buffers (caches), drivers, repeaters, and receivers, to enable communications. Further, local interface 616 may include address, control, and/or data connections to enable appropriate communications among processing device 602, memory 604, input/output devices 612, network interface device 614, and any other components included in multi-layer structure design system 600.

Memory 604 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 604 may incorporate electronic, magnetic, optical, and/or other types of storage media. Memory 604 may also have a distributed architecture, where various components are situated remote from one another, but may be accessed by the processing device 602. As stated above, memory 604 may comprise an operating system 606, one or more applications 608, and a multi-layer structure design module 610.

Operating system 606 may be any of the following, or other, operating systems: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as PalmOS available from Palm Computing, Inc. and Windows CE available from Microsoft Corporation). Operating system 606 essentially controls the execution of other computer programs, such as the applications 608 and multi-layer structure design module 610, and provides scheduling, input-output control, file and data management, memory management, and communication control and related services.

Processing device 602 may be a hardware device for executing software located in memory 604. Processing device 602 may be any custom made or commercially available processor, a central processing unit (CPU), a semiconductor based microprocessor (in the form of a microchip or chip set), a macroprocessor, or generally any device for executing software instructions. Network interface device(s) 614 may be any device configured to facilitate communication between multi-layer structure design system 600 and a communication network, such as a public or private packet-switched or other data network including the Internet, a circuit switched network, such as the public switched telephone network, a wireless network, an optical network, or any other desired communications infrastructure. Input/output devices 614 may comprise any device configured to communicate with local interface 616. One of ordinary skill in the art will appreciate that input/output devices 614 may include any of the following, or other, devices: a keyboard, a mouse, a display device, such as a computer monitor, a serial port, a parallel port, a printer, etc.

Multi-layer structure design module 610 may be implemented in hardware, software, firmware, or a combination thereof. As illustrated in FIG. 6, in one of a number of possible embodiments, multi-layer structure design module 610 may be implemented in software or firmware that is stored in memory 604 and executed by processing device 602 or any other suitable instruction execution system. If implemented in hardware, as in alternative embodiments, multi-layer structure design module 610 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
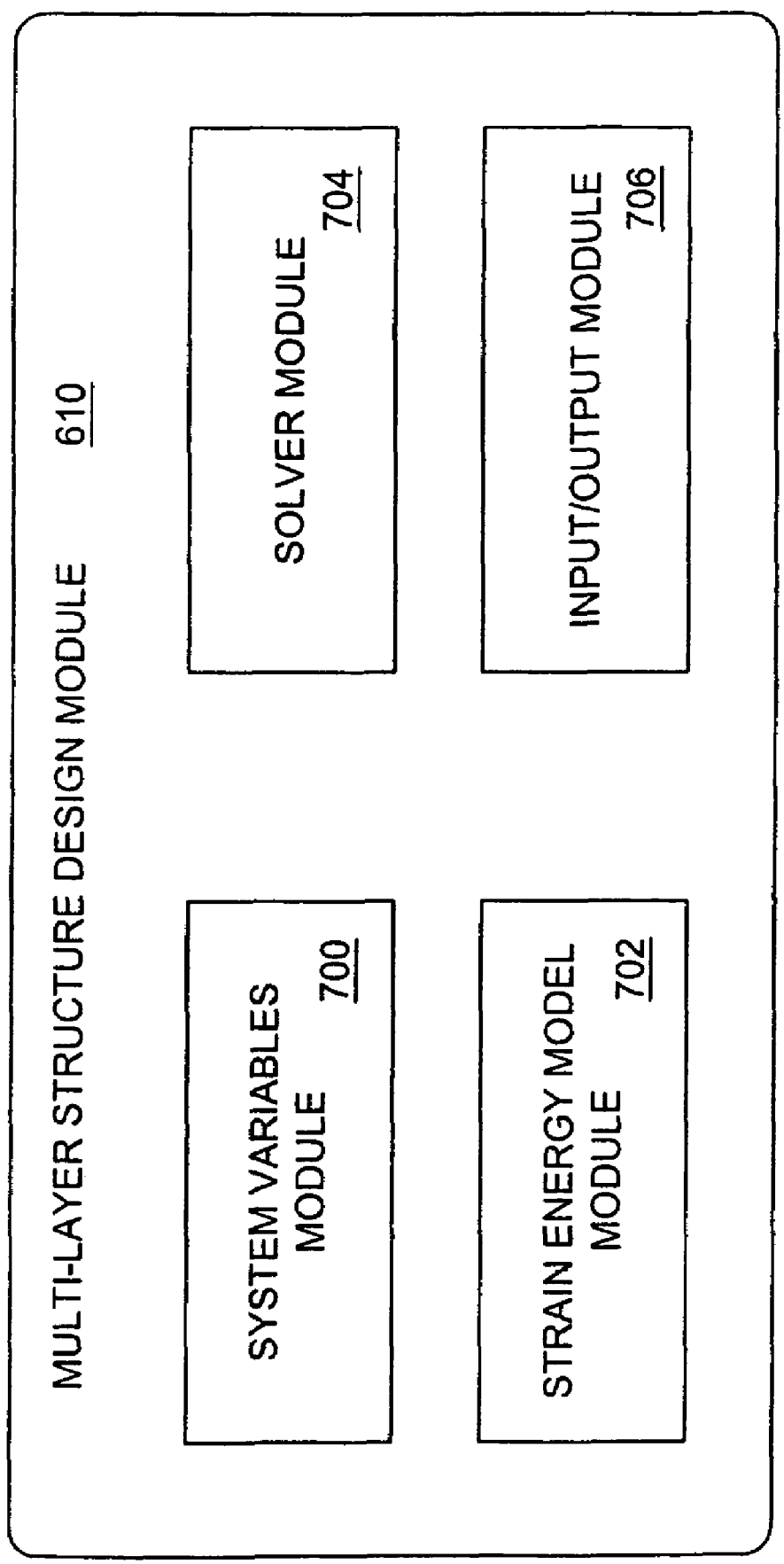
FIG. 7 is a block diagram illustrating the architecture, functionality, and/or operation of an exemplary embodiment of the multi-layer structure design module of FIG. 6.

FIG. 7 is a block diagram illustrating the architecture, functionality and/or operation of an embodiment of multi-layer structure design module 610 of the present invention. One of ordinary skill in the art will appreciate that multi-layer structure design module 610 may include one or more logic modules for designing any of the multi-layer structures described above, or others. For example, in the embodiment illustrated in FIG. 7, multi-layer structure design module 610 comprises a system variables module 700, a strain energy model module 702, a solver module 704, and an input/output module 706. System variables module 700 may be configured to define a set of variables related to materials properties of the layers (i.e., the central layer, the first layer, and the second layer) in the multi-layer structure being designed. For example, system variables module 700 may define variables related to any of the following, or other, materials properties: a variable associated with a physical dimension of a layer (i.e., a thickness variable), a Young's elastic moduli variable, a thermal expansion coefficient variable, a Poisson's ratio variable, etc.

Strain energy model module 702 may be configured to define a mathematical representation of the strain energies in one or more of the layers in the multi-layer structure being designed. The mathematical representation may include any of the variables defined by the system variables module 700. Furthermore, the mathematical representation may employ any of a variety of mathematical techniques. For instance, the mathematical representation may involve numerical mathematical techniques, analytical mathematical techniques, other mathematical techniques, or any combination thereof. In certain embodiments, strain energy model module 702 may be configured to model the strain energies using the system of equations described above.

Solver module 704 may be configured to determine one or more solutions to the mathematical representation, which satisfy the boundary condition that, upon a change in temperature, the strain energy in the first layer and the strain energy in the second layer are substantially equal. The specific methods of solving the mathematical representation may differ depending on the configuration of the mathematical representation in the strain energy model module 702. As described above, a computer program, such as TK Solver 4.0, may be used to solve the mathematical representation. In other embodiments, a matrix inversion routine, a procedural program written in a computer language, or a spreadsheet program, such as Microsoft Excel, may be used.

Input/output module 706 may be configured to provide input/out functionality to multi-layer structure design module 610. For example, input/out module 706 may be configured to receive design values for the materials properties variables being used to design a multi-layer structure. Input/output module 706 may be configured to prompt a user via a display device, a graphical user interface, etc., for design values for one or more of the materials properties variables. The user may input the design values via a user interface device, such as a keyboard, a mouse, a touch-sensitive screen, etc. In this manner, input/output module 706 enables the user designing the multi-layer structure to specify various input variables and then solve the mathematical representation based on the input variables. Thus, by way of example, a user may desire to design a three-layer structure 10 (FIG. 1) in which the central layer and another layer have specific materials properties. Using input/output module 706, the user may specify the particular materials properties for these layers, and then solve the mathematical representation to determine values for the other materials properties which satisfy the given boundary condition.

Input/output module 706 may also be configured to provide output based on the solutions to the mathematical representation. For example, after a user provides the design values and one or more solutions are determined, input/out module 706 may be configured to provide information related to the one or more solutions. This information may be provided to the user via any of the I/O devices 614 and/or network interface device 612.

Any process descriptions or blocks in FIG. 7 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art.

In addition, multi-layer structure design module 610, which comprises executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The invention claimed is:

1. A method of fabricating a multi-layer structure, the method comprising the steps of:
   providing a central layer;
   constraining a first layer to a first side of the central layer, the first layer having a first thickness, and a first value for a thermal expansion property and a first volume associated therewith;
   providing an optical waveguide core formed within the first layer, the optical waveguide having a second volume associated therewith, and
   constraining a second layer to a second side of the central layer, the second layer having a second thickness and a second value for a thermal expansion property, the second thickness and the second value for a thermal expansion property and the first thickness and the first value for a thermal expansion property being such that, upon a change in temperature, the net change in strain energy in the first layer and the net change in strain energy in the second layer are substantially equal, wherein the thickness of the first layer is greater than 3.3 times the thickness of the second layer, and the first volume is greater than the second volume.

2. The method of claim 1, wherein the thermal expansion property comprises a graded set of thermal expansion properties.

3. The method of claim 1, further comprising the step of adjusting the strain energy in the first and second layers.

4. The method of claim 3, wherein the step of adjusting the strain energy in the first and second layers consists of one of a stock addition technique and a stock removal technique.

5. The method of claim 4, wherein the stock removal technique consists of one of polishing, chemo-mechanical polishing, grinding, and etching.

6. The method of claim 1, wherein the curvature of the structure is substantially close to zero at room temperature.

7. The method of claim 1, wherein the curvature of the structure is less than 0.01 radians per meter at room temperature.

8. The method of claim 1, wherein the curvature of the structure is less than 0.05 radians per meter at room temperature.

9. The method of claim 1, wherein the temperature coefficient of curvature of the structure is substantially close to zero.

10. The method of claim 1, wherein the temperature coefficient of curvature of the structure is less than 0.0001 radians per meter per degree Celsius.

11. The method of claim 1, wherein the temperature coefficient of curvature of the structure is less than 0.0005 radians per meter per degree Celsius.

12. The method of claim 1, wherein the thickness of the first layer is greater than 10 times the thickness of the second layer.

13. The method of claim 1, wherein the thickness of the first layer is greater than 20 times the thickness of the second layer.

14. The method of claim 1, wherein the thickness of the first layer is greater than 30 times the thickness of the second layer.

* * * * *